Aug. 25, 1953  R. L. EWALD ET AL  2,649,880
MECHANISM FOR PROCESSING FRUIT
Filed April 22, 1949  11 Sheets-Sheet 1

INVENTORS.
Raymond L. Ewald
Henry A. Skog
By: Moore, Olson & Trexler attys.

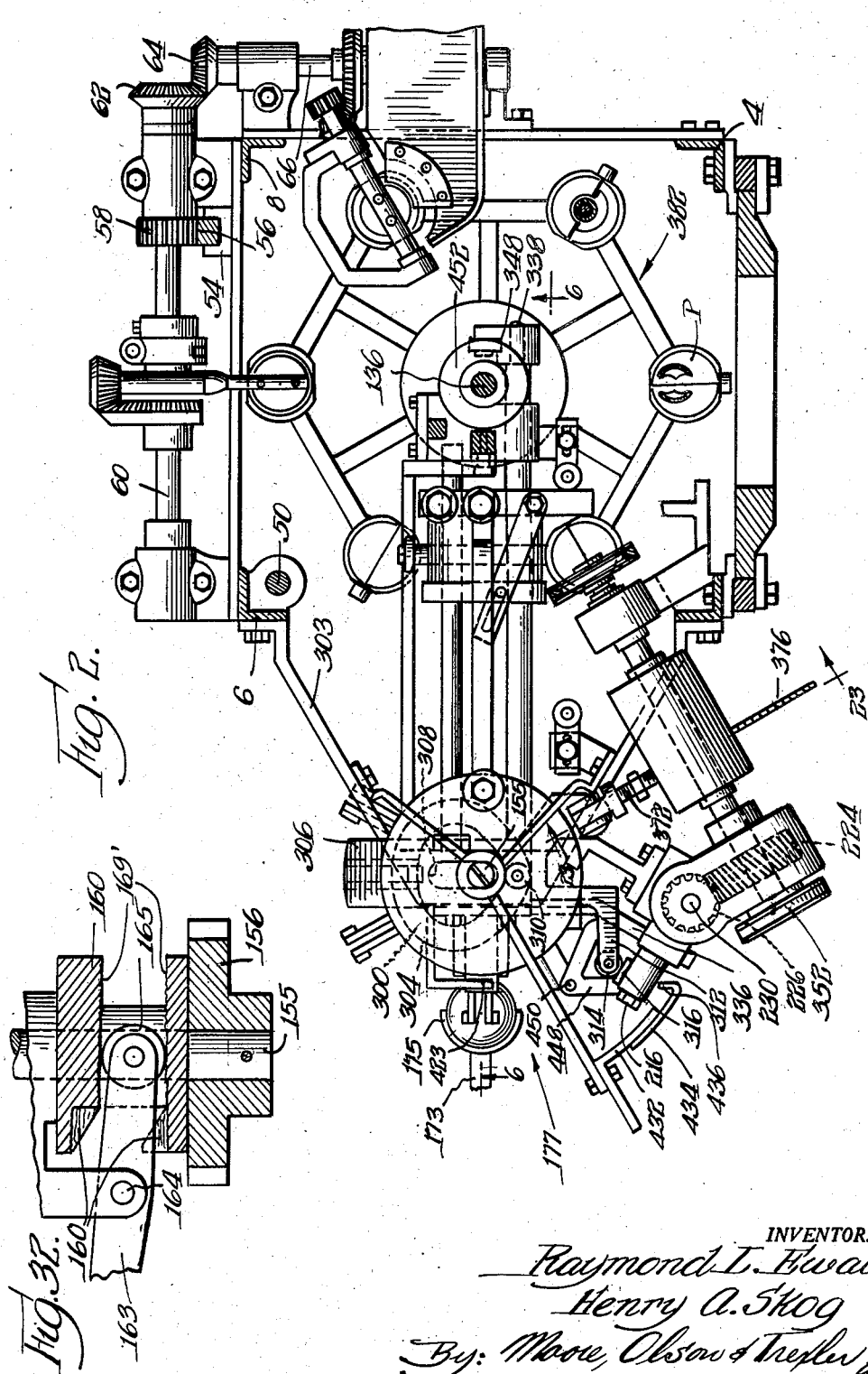

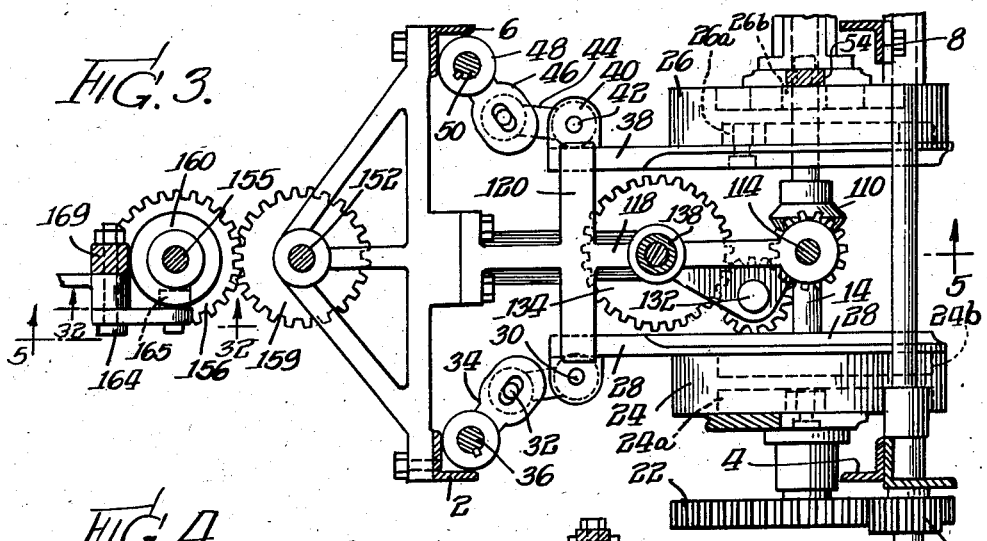
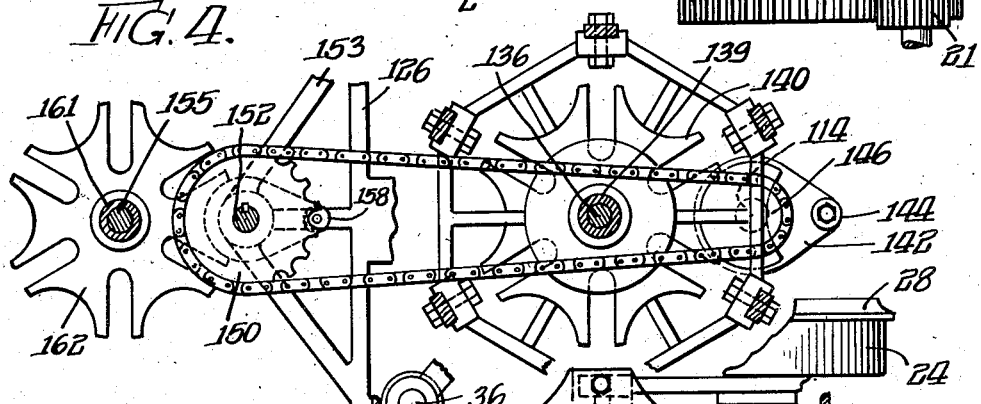
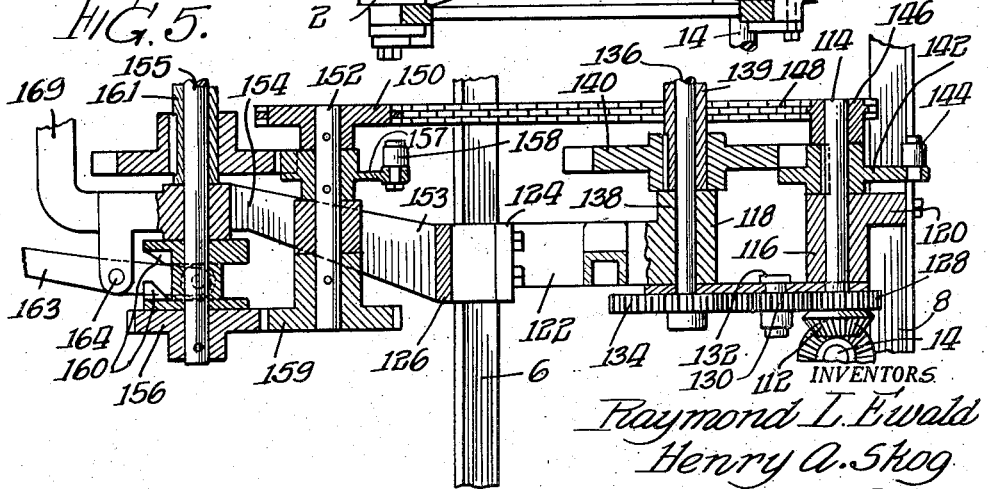

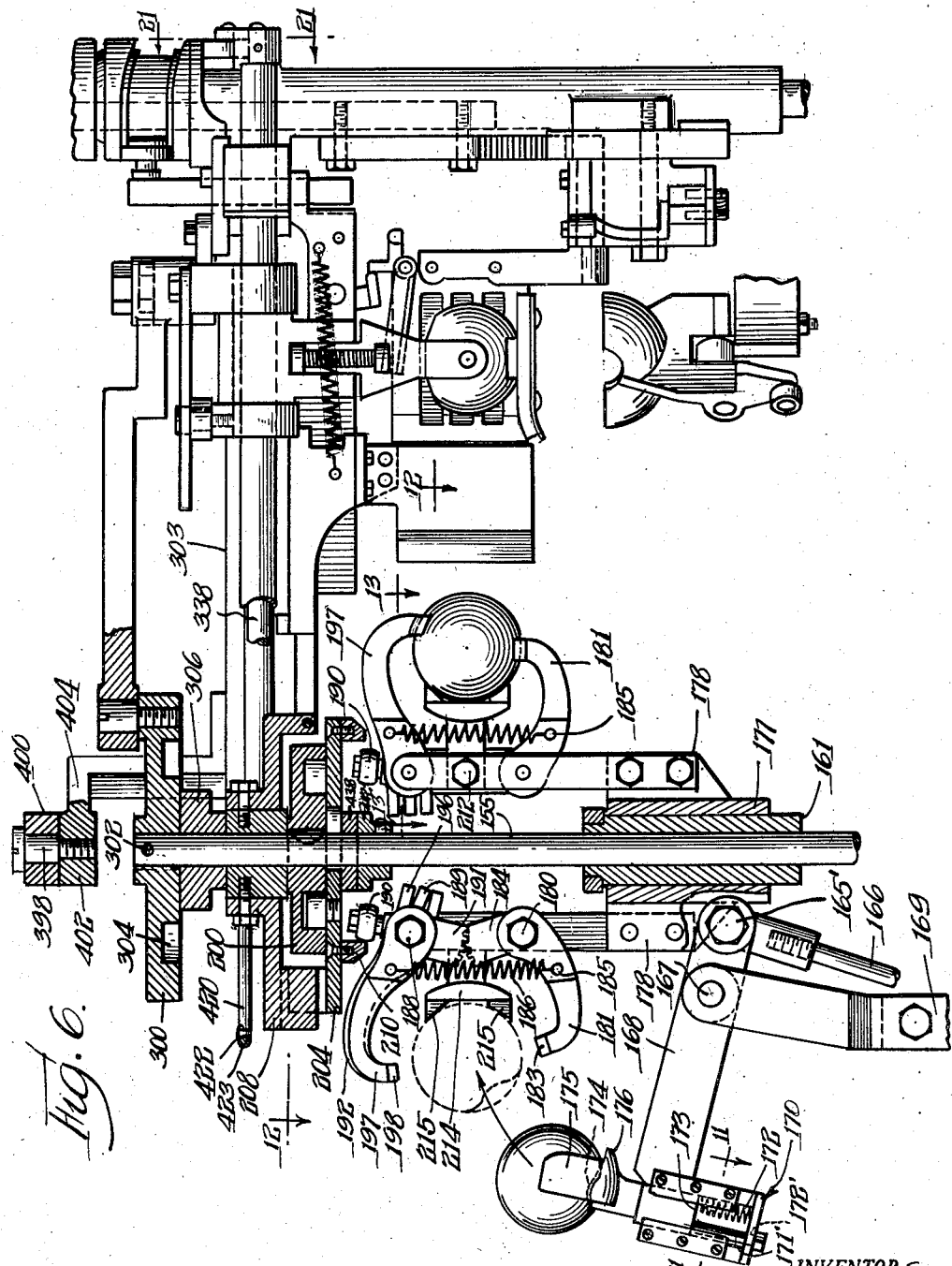

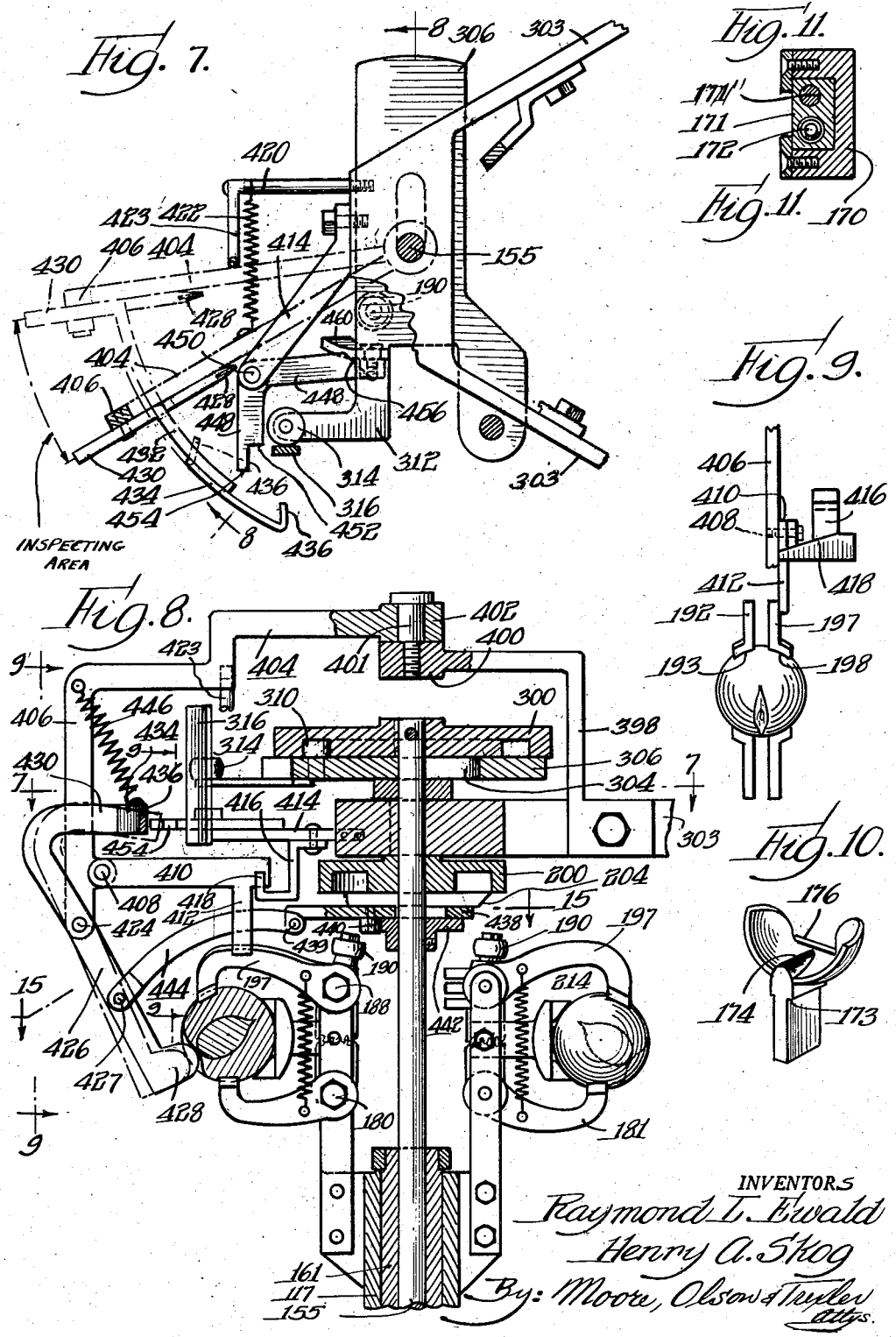

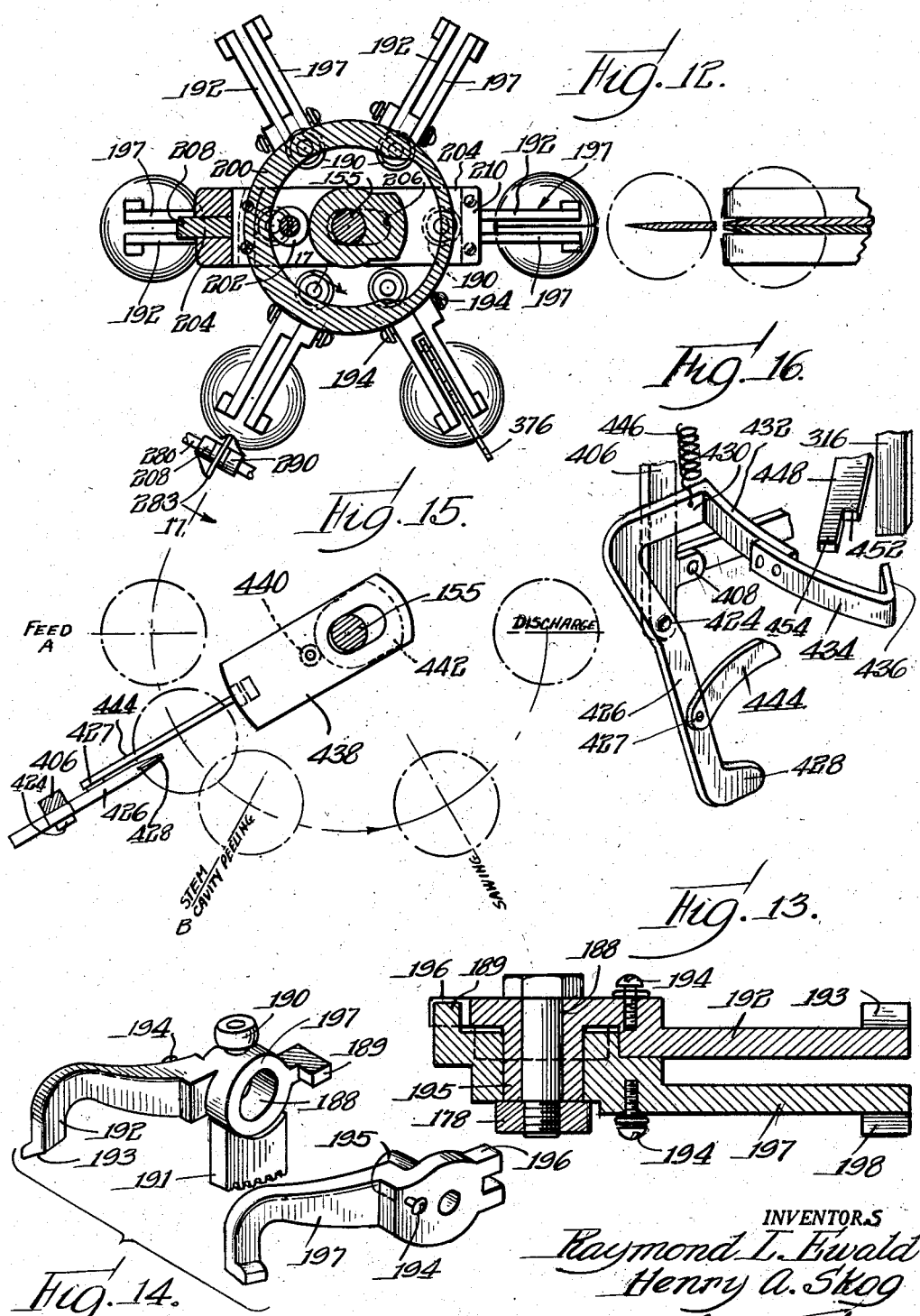

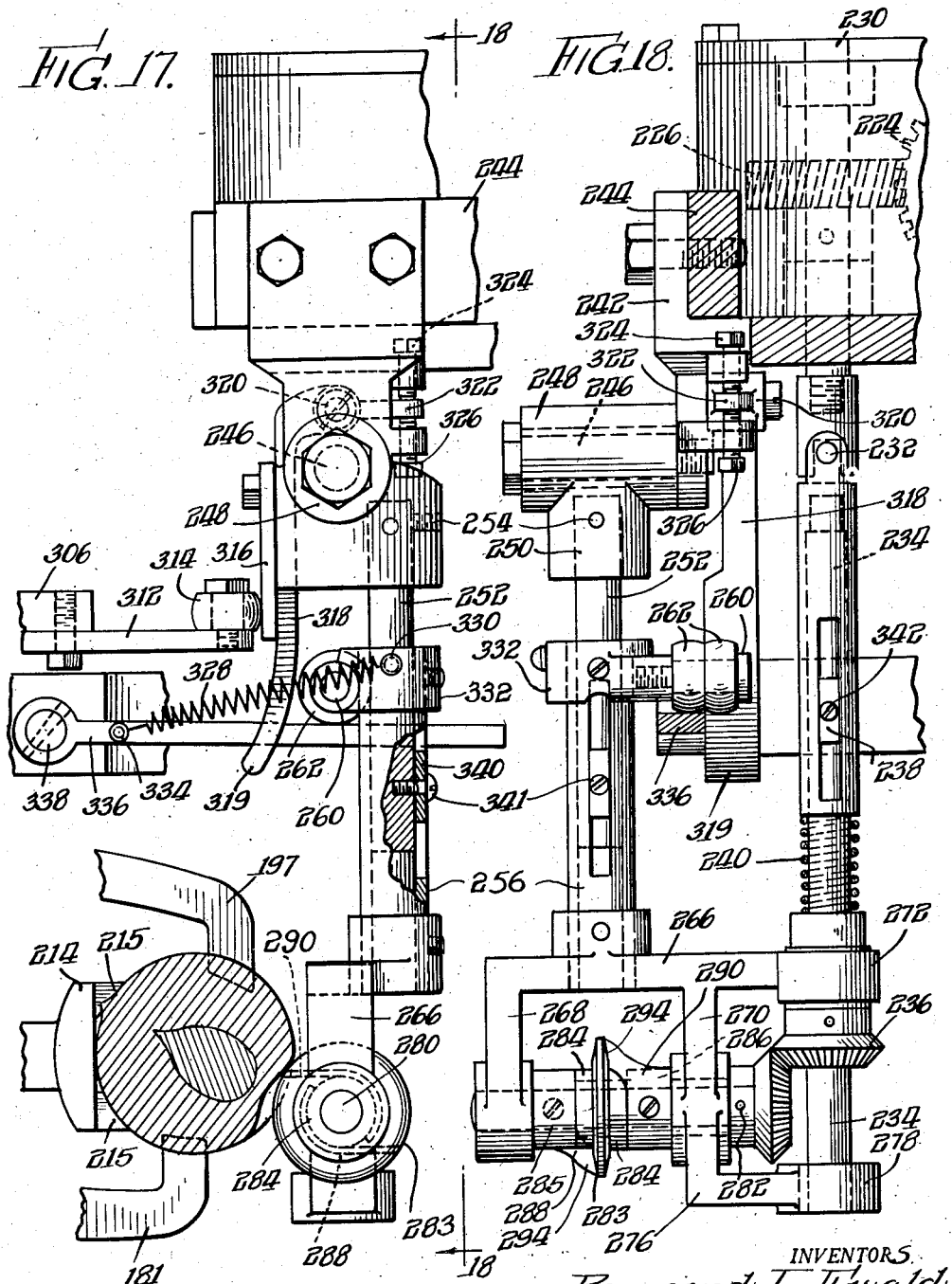

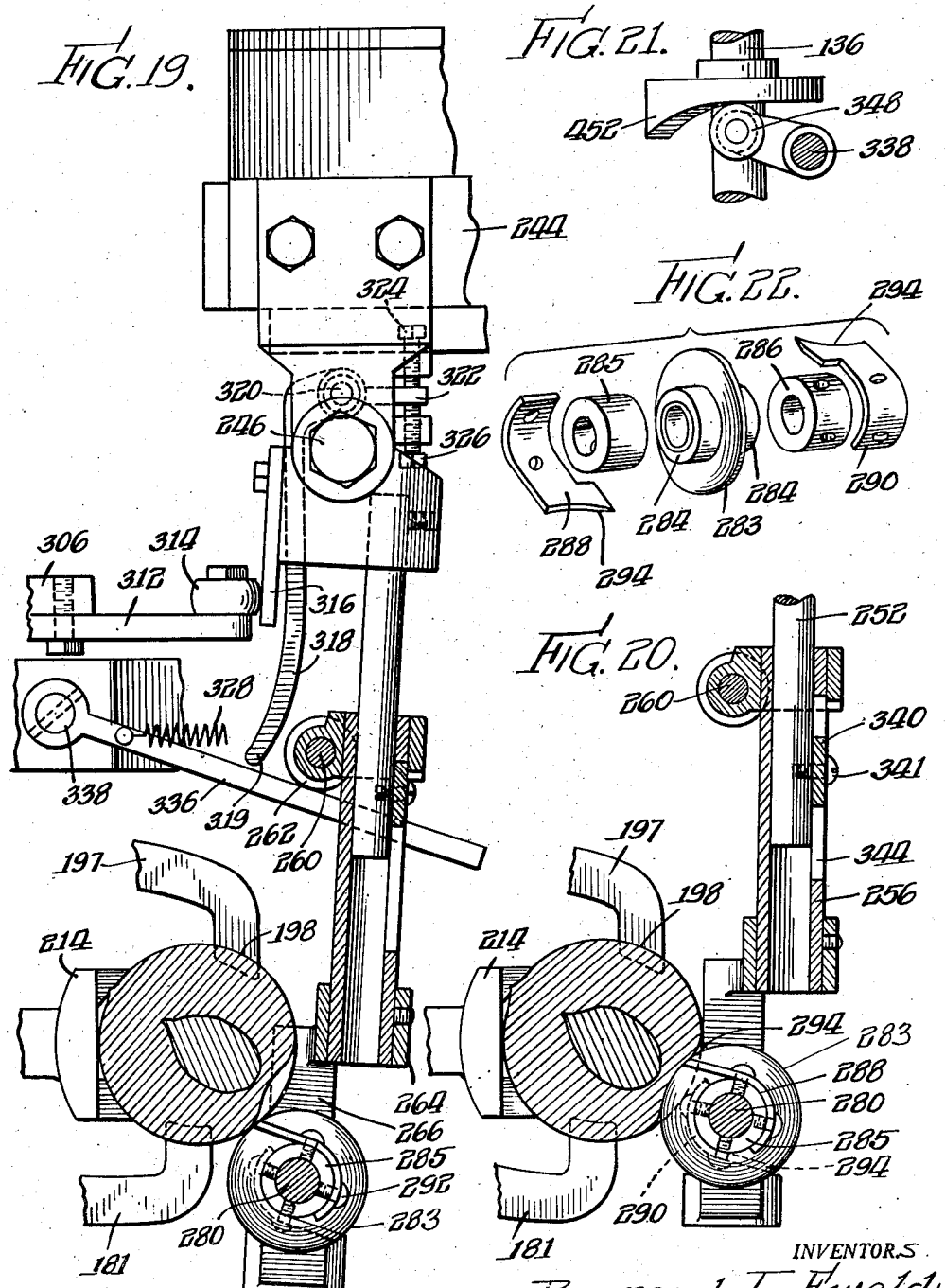

Aug. 25, 1953  R. L. EWALD ET AL  2,649,880
MECHANISM FOR PROCESSING FRUIT
Filed April 22, 1949  11 Sheets-Sheet 9
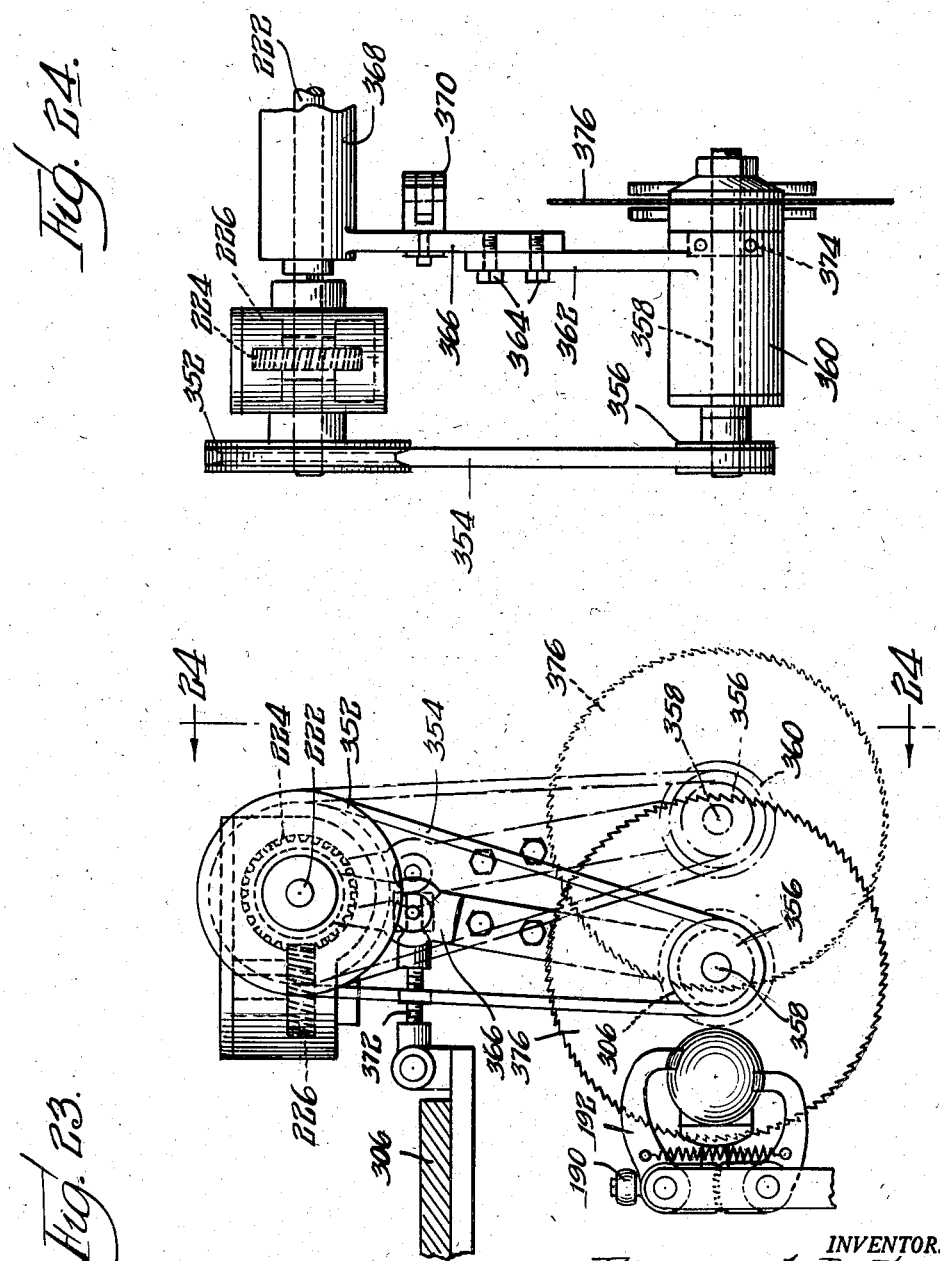
INVENTORS
Raymond L. Ewald
Henry A. Skog
By:- Moore, Olson & Trexler
Attys.

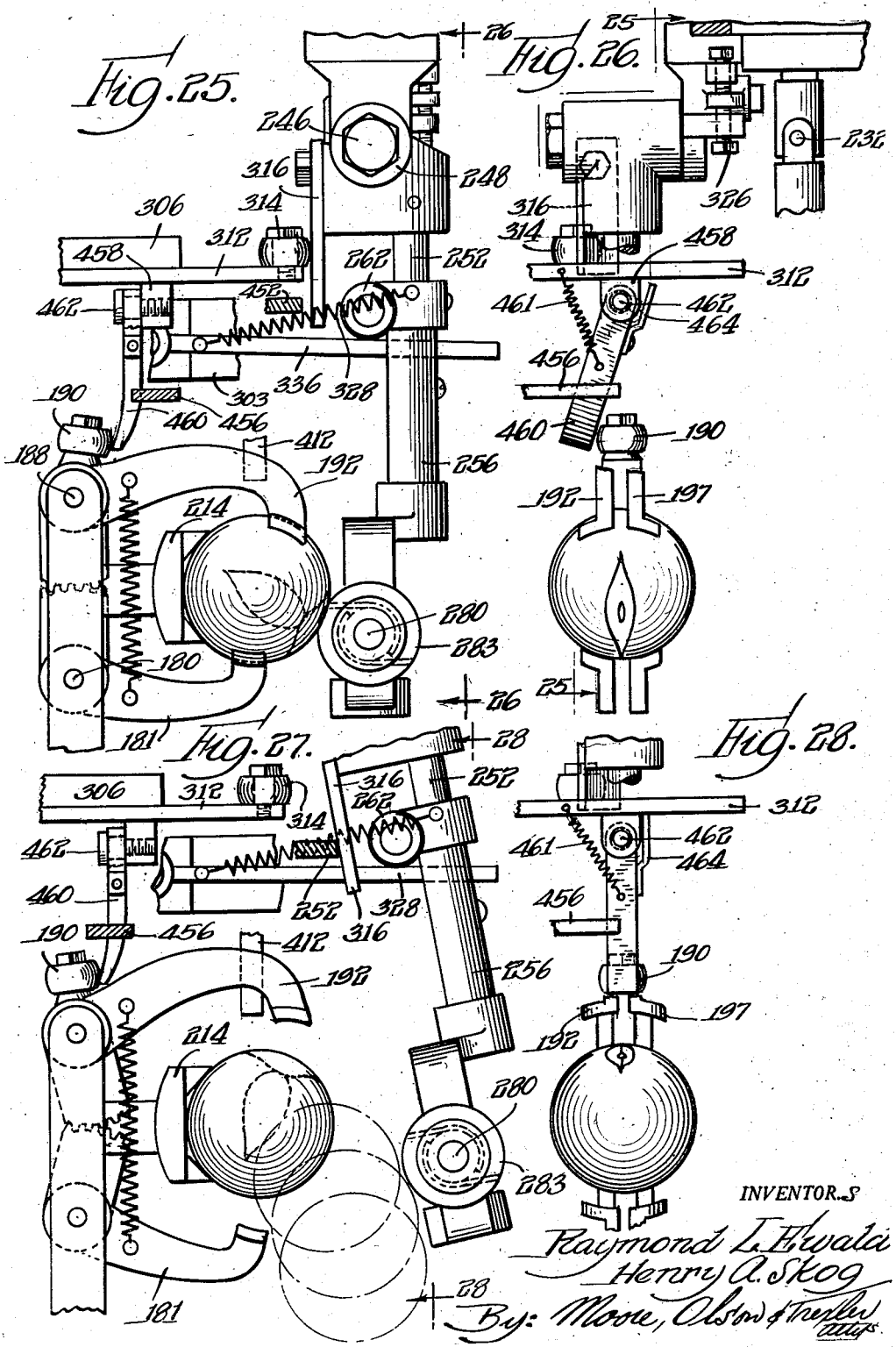

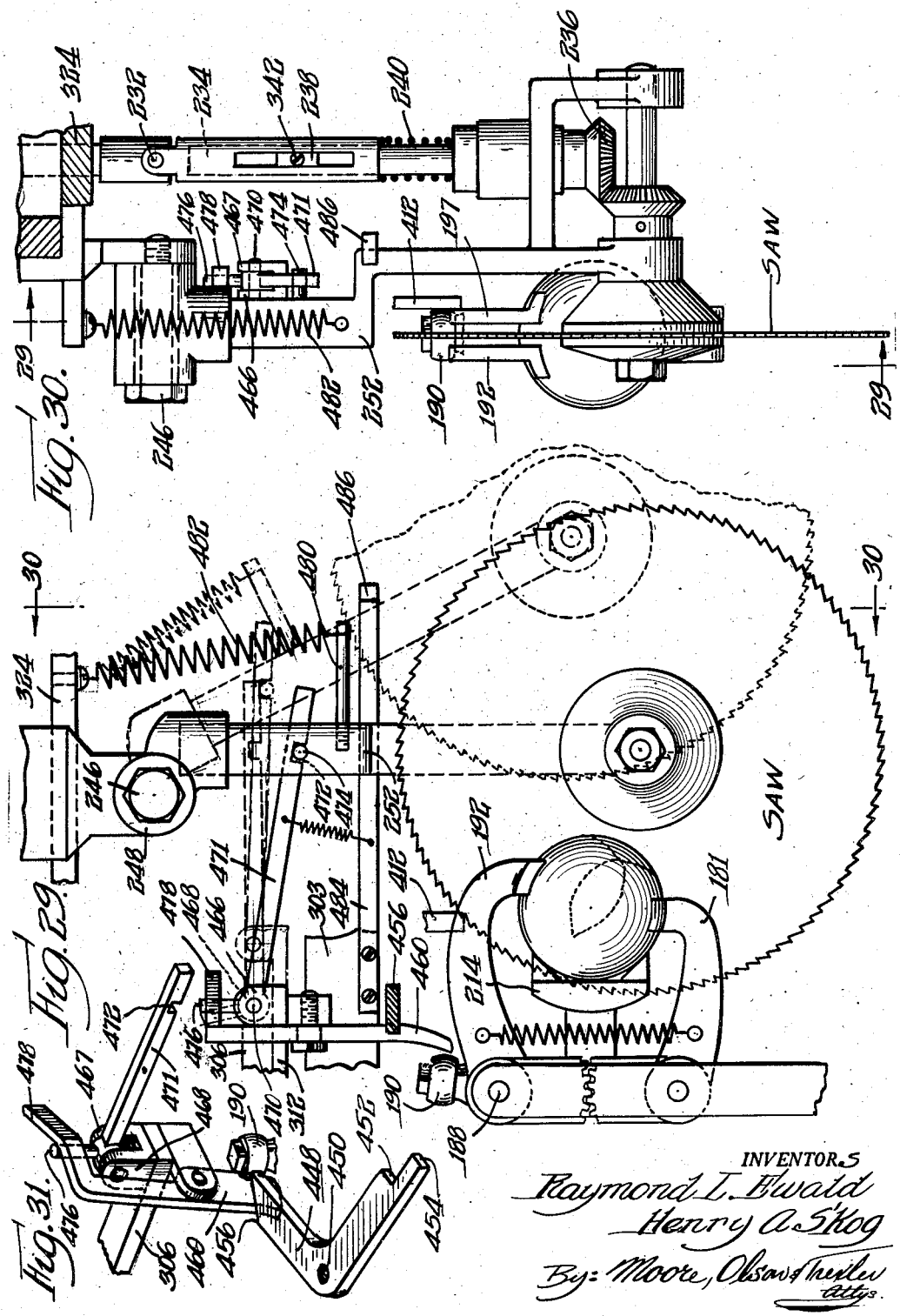

Patented Aug. 25, 1953

2,649,880

UNITED STATES PATENT OFFICE 2,649,880

MECHANISM FOR PROCESSING FRUIT

Raymond L. Ewald and Henry A. Skog, Olympia, Wash., assignors to Special Equipment Company, Portland, Oreg., a corporation of Oregon Application April 22, 1949, Serial No. 89,124

15 Claims. (Cl. 146—73)

This invention relates to an apparatus for processing fruit having a stem indent, such as peaches, apples, apricots and other fruit having stem indents, and more particularly, it relates to suture plane or long axis stem indent inspection means, for determining whether or not the suture plane of the peach is properly oriented, and it also relates to mechanism operated by the inspector means.

Among the objects of the present invention are to provide, in a machine for processing whole peaches which includes the operations of cutting the peaches in half and/or pitting the separate halves, means for feeding whole peaches to the bisecting and pitting means or other fruit cutting means, or in association with the feeding means and the bisecting and fruit cutting means, there is provided orienting means including a member shaped to correspond with the long axis of the stem indent and associated peach supporting means, together with mechanism for causing a relative shifting movement between the peach support upon the supporting means and this orienting member whereby to cause the orienting member to project into the long axis of the stem indent to a maximum distance which corresponds with the proper orientation of the peach with respect to a predetermined plane, and in association with the foregoing mechanism which forms a particular feature of the present invention, there is provided suture plane inspection means which is adapted relatively to move the whole peach as the latter is fed to certain processing stations of the machine and whereby there is also provided in association with such movable inspection means, mechanism operable by the relative movement of the peach and the inspecting means as they move together for preventing a cutting operation being performed upon the peach in the event that the inspection means determines that the suture plane of the peach has not been properly oriented; to provide, in combination with mechanism for orienting a whole fruit to position the fruit in a predetermined position, means for conveying the fruit which has been subject to an orienting operation in combination with inspector mechanism travelling bodily with the conveyed fruit for inspecting a stem indent of the whole fruit to determine whether or not the core axis of the fruit is so properly oriented, and in association with such travelling inspector means, additional mechanism controlled thereby for preventing any subsequent cutting operation to be performed upon the whole fruit in the event the fruit be improperly oriented, to provide in combination with whole peach orienting means functioning to orient a suture plane of a whole peach into a predetermined plane and in combination with feeding means for feeding such oriented fruit to processing means including means to cut the fruit, inspector means operating upon the fruit while being conveyed by the feeding means and controlling mechanism for discharging the fruit from the feeding means if the suture plane be not properly oriented and/or also means for positively preventing locking or stopping the cutting means from cutting into the fruit when proper orientation is not effected; to provide in combination with whole peach suture plane orienting means, and peach bisecting means, feeding means for feeding a whole peach from the orienting mechanism to the bisecting mechanism together with suture plane inspection means adapted to move with the travelling conveyed fruit and operable thereon while so travelling to determine whether or not the suture plane of the peach is properly oriented, and if not, to actuate mechanism to discharge the peach from said feeding means prior to the peach being fed to the bisecting means and alternatively operable if the peach be properly oriented as to suture plane to cause the feeding means to continue to feed the properly oriented whole peach to the peach bisecting or other processing means; to provide in combination with a machine having means orienting a whole peach as to its suture plane, whole peach feeding means for feeding the whole peach to peach cutting means in combination with peach inspector means having an elongated peach contacting member shaped generally to conform to the long axis of the stem indent and operable upon the peach as the peach is conveyed by peach-conveying means and actuating additional mechanism for positively locking the peach cutting means from operation upon a peach if the suture plane of the peach be not properly oriented; or alternatively discharging the improperly oriented peach from the conveyor before the peach can be cut to provide these and other objects of invention as will be apparent from a perusal of the following specification when taken in connection with the accompanying drawings, wherein:

Figure 2 is a plan section taken on the line 2—2 of Figure 1;

Figure 3 is a section taken on the line 3—3 of Figure 1;

Figure 4 is a section taken on the line 4—4 of Figure 1;

Figure 5 is a section taken on the line 5—5 of Figure 3;

Figure 6 is a section taken on the line 6—6 of Figure 2;

Figure 7 is a plan section taken on the line 7—7 of Figure 8 with portions of the inspection mechanism of the present invention associated therewith;

Figure 8 is a vertical sectional view taken on the line 8—8 of Figure 7 showing portions of the inspector and fruit discharging mechanism;

Figure 9 is a detail sectional view showing a part of the inspector mechanism and taken on the line 9—9 of Figure 8;

Figure 10 is a perspective view of the whole fruit cup showing the interior boss-like member shaped to correspond with the long axis of the stem indent;

Figure 11 is a detailed section taken on the line 11—11 of Figure 6;

Figure 12 is a plan sectional view taken on the line 12—12 of Figure 6;

Figure 13 is a section taken on the line 13—13 of Figure 6, showing the clamping jaws in plan section;

Figure 14 shows a perspective view of the peach holding jaws;

Figure 15 is a plan sectional view of certain portions of the inspector mechanism apparatus and being taken on the line 15—15 of Figure 8;

Figure 16 is a perspective view of some of the parts which comprise a portion of the inspector mechanism;

Figure 17 is a sectional view taken on the line 17—17 of Figure 12;

Figure 18 is a section taken on the line 18—18 of Figure 17;

Figure 19 is a view showing a changed position of the parts shown in Figure 17;

Figure 20 is a view showing a changed position of the parts as shown in Figure 19;

Figure 21 is a section on the line 21—21 of Figure 6;

Figure 22 shows detailed perspective views of a form of whole peach cutting means;

Figure 23 is a sectional view taken on the line 23—23 of Figure 2;

Figure 24 is a side view of Figure 23 and looking in the direction of the arrows 24—24;

Figure 25 is a view similar to Figure 17, and taken on the line 25—25 of Figure 26;

Figure 26 is a view similar to Figure 18 taken on the line 26—26 of Figure 25;

Figure 1:
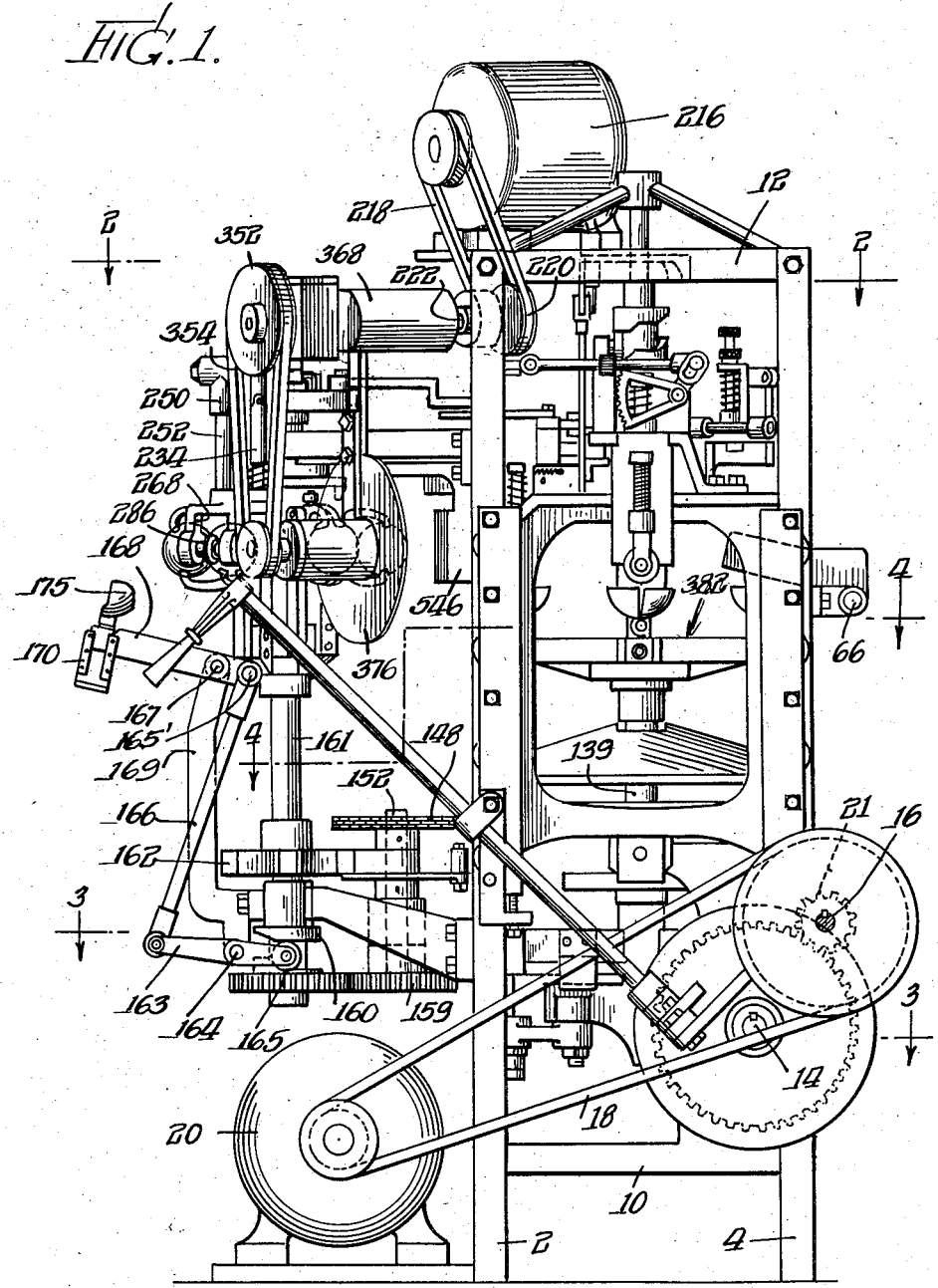
Figure 1 is a view of the machine as seen from the infeeding and pitting stations.

Figures 27 and 28 are views similar to Figures 25 and 26, showing changed positions of the parts as shown in Figures 25 and 26;

Figure 29 is a view similar to Figure 25, showing a modified type of construction and being taken on the line 29—29 of Figure 30;

Figure 30 is a side elevational view of the parts shown in Figure 29 and looking in the direction of the arrows 30—30;

Figure 31 is a fragmentary perspective view showing in detail some of the operating mechanism; and Figure 32 is a fragmentary detail sectional view taken on the line 32—32 of Figure 3.

*General machine structure*

The invention of the present construction preferably takes the form of an upright, substantially square main frame comprising four corner posts or angle irons 2, 4, 6, and 8 (see Figures 1, 3 and 4), suitably braced at top and bottom by cross-braces 10 and 12. In addition, other hereinafter described cross bars serve as rigid supports for these upright members. In a general way, extending laterally from this rectangular frame projects a supplementary frame adapted to be bolted or otherwise attached thereto, as shown in Figures 1 to 4, inclusive, which supplementary frame is utilized to support the mechanism which initially receives and orients the fruit, the mechanism which severs the peeling at the stem cavity of the fruit, which severs the fruit in halves and which transports the severed halves to the pitting, peeling, fruit-discharging and peel-scavenging mechanism.

The main upright frame hereinbefore described is provided on a relatively low level thereof with horizontally disposed shafts 14 and 16, the latter being power driven through a clutch mechanism (see Figure 1) by means of a belt 18, adapted, in turn, to be driven from any suitable motor 20. The clutch mechanism is of any desirable construction capable of connecting and disconnecting the power source to the main operating shaft of the machine.

The shaft 16 carries a gear 21, driving another gear 22 on the horizontal shaft 14. This shaft 14 carries two main cams 24 and 26 fixed on opposite ends thereof. Each of these cams are double-faced so as to provide cam operating means on each side thereof. Cam face 24a comprises a cam track in which operates a hereinafter described roller on a vertically reciprocable slide for raising and lowering the main tool carrying slide hereinafter described. An opposed cam face forms a roller race, in which a roller on a horizontally reciprocable slide 28 shifts in a horizontal motion transversely to the shaft 14. This slide carries on its outer end a bearing pivot 30 linked to a bearing pivot 32 on an arm 34 fixed on a vertical shaft 36. This shaft has fixed bearings in the housing frame 2 of the main upright frame of the machine. Vertical shaft 36 is oscillated by the slide 28 for operating the peeling mechanism, the details of which are not herein shown.

The cam 26 of the shaft 14 has a cam face 26a forming a cam race, which operates a roller, connected to and operating a horizontally reciprocable slide 38, as shown in Figure 3. This slide 38 is also provided on its outer end with bearing 40 having a vertical pin 42, to the lower end of which is pivoted a link 44. This link 44 carries at its outer end an arm 46, the outer bearing 48 of which is pinned to a vertical oscillatable shaft 50, which is mounted in the corner post 6 of the frame opposite the vertical shaft 36. This shaft 50 has affixed to its upper end an arm hereinafter referred to, which, in turn, pivotally connects at its outer end to a relatively long rod running diagonally across to a universal connection which is, in turn, connected to a mechanism that operates a sector gear reciprocable about a horizontal axis for operating the mechanism which actuates the pitting knives, the details of which are also herein omitted.

Cam race 26b operates a vertically reciprocable slide 52 (Figure 6, our Patent 2,398,780), the upper end of which is provided with a rod 54 having a rack tooth portion 56 operating a pinion 58 on a horizontal shaft 60. This shaft 60 has on one end a bevel gear 62 which, in turn, operates bevel gear 64 on shaft 66 having bearings on the outside of the vertical frame member and on the same level as the main fruit cup turret hereinafter described, which turret is above that lower level of the machine at which the shafts 14 and 16 are located. The shaft 66 operates the mechanism for oscillating the fruit discharging means to eject the processed half fruit from the machine.

A second level of the main rectangular frame of the machine bounded by the uprights 2 to 8, inclusive, provides the location for the Geneva gears for driving the main or half fruit-holding turret, and also the whole fruit turret, including the driving means therebetween, whereby the main or half fruit holder turret is driven at twice the speed as the whole fruit turret. To effect this function, the shaft 14 carries between its ends a bevel gear 110 (see Figure 3) meshing with a bevel gear 112 on a vertical shaft 114 mounted in the bearing 116 carried by a cross frame 118. This cross frame is supported at one end by suitable vertical brace connected to a cross bar 120 (see Figure 5), in turn carried by the vertical upright frame members 4 and 8. The opposite end 122 of cross frame 118 is bolted to an end support by a projection 124 from a horizontal cross bar 126 carried by the opposite vertical uprights 2 and 6 of the main frame at about the level of the cross frame 118. This cross bar 126 is preferably an integral part of the substantial triangularly shaped supplementary frame carrying the whole fruit turret.

Shaft 114 carries a bevel gear 112 and also carries above it a gear 128, which latter meshes with a second gear 130 on a bearing 132 on the cross frame 118. Gear 130 meshes with the larger gear 134 horizontally fixed on vertical shaft 136 having a bearing in cross frame 118. Turret shaft 136 is surrounded by a bearing 138, above which is a long sleeve 139, along which is fixed a Geneva gear 140 having slots cooperating with a Geneva member 142 on shaft 114. This latter Geneva member 142 has a circular periphery on which is mounted roller 144 for cooperation with the radial slots of gear 140 aforesaid for intermittently rotating sleeve 139 and for holding it stationary between partial turns. The upright shaft 114 above the Geneva member carries a sprocket gear 146 (see Figure 5) driving a chain 148 running horizontally across the frame of the machine to a larger sprocket 150 fixed to shaft 152. This shaft is mounted upon a substantially triangular frame 153 carried by and integral with the cross bar 126. The frame 153 carries a bearing for the shaft 152, and also has a heavy extension bearing 154 for the whole fruit turret shaft 155. Both of these shafts are vertical and parallel to each other. The whole fruit turret shaft 155 extends vertically upward toward the top of the frame. The shaft 152 has pinned thereto just above the bearing 153 a part of the Geneva, this part carrying the roller 158.

In addition, the shaft 152 has pinned below the support 154 a gear wheel 159 which meshes with another gear 156, which is pinned to the bottom of the shaft 155. Just above the gear 156, cam 160 is pinned to shaft 155, and above the bearing 154 the shaft 155 carries a relatively long sleeve 161 to which is keyed the cooperative part 162 of the Geneva, whereby, through the intermediary of the Geneva 162, the sleeve 161 is intermittently rotated. Sleeve 161 carries the whole fruit feed turret.

*Whole fruit feed station and orienting means*

In accordance with the present invention initial feeding and orienting means is provided for the fruit whereby an operator may feed whole peaches one at a time to the whole fruit holding mechanism carried by the whole fruit turret, and such mechanism comprises orienting means and automatically shiftable means preferably including a concave receiver, into which a whole peach is placed by the operator, so that the stem indent and suture plane of the whole fruit is precisely and definitely located with respect to this receiver, whereby upon the shiftable operation of this feeding mechanism or receiver, the whole peach is properly oriented both as to stem indent and suture plane, and also automatically conveyed to whole peach gripping means preferably in the form of spaced fingers or jaws which are adapted automatically to grip the whole fruit adjacent and on substantially opposite sides of the suture plane of the whole fuit, and thereafter firmly to hold the whole fruit in the precise position in which it was placed in the first mentioned whole fruit receiving means. Thereafter this whole fruit gripping means is turned by the turret mechanism carrying it to a plurality of stations provided with mechanism for operating upon the peach while thus precisely held.

Direct positioning and orientation of the whole peach in the machine and the maintenance of control of a certain alignment with respect to the suture plane and stem cavity is very important for efficient results obtained from successive processing operations on the peach while it is fed through the machine. It is undesirable to provide feeding mechanism which gives the operator any particular leeway in properly placing the peach in the feeding jaws of the whole fruit turret, and therefore the hereinbefore described means is provided for eliminating chance and guesswork by the provision of means whereby the operator merely places the stem cavity of the whole peach over a locating means, and in the construction of the whole fruit receiver with concaved walls, whereby the rounded body of the peach automatically aligns its suture, so that subsequent operations may be exactly determined.

To this end therefore, mechanism for feeding a whole peach to fruit holding mechanism of the whole fruit turret is illustrated as an arm 163, Figure 1, pivoted at 164, and provided with a roller 165 working in the cam race of the cam 160. The outer end of the arm 163 has pivoted thereto an elongated rod-like arm 166, the upper end of which is pivoted as at 165', to a lever 168 pivoted in turn at 167 to a stationary extension frame or bracket 169. This bracket, as shown in Figure 7, is made adjustable. The lever 168 carries on its outer end a guideway 170. The guideway is disclosed more in detail in Figures 9, 10 and 13 and is so arranged that a block 171 is slidable therein, being normally and resiliently pushed to upward position by means of a spring 172. This block has attached to it a rod 171' which slides through an opening 172' in the bottom plate of the slide 170. The bottom plate has an opening through which this rod 171' may slide and the lower end of the rod carries a head which contacts the under face of the end of the guideway 170 and since the bottom of the spring 172 bears between the bottom end of the guideway 170 and the lower face 173 of slide 171, the slide is thus normally and resiliently pushed upward but is free to yield downwardly in the event an extra size peach is inserted in the receiver carried by the slideway. Thus the spring 172 by reason of its resiliency permits some latitude in the positioning of the whole fruit with respect to the stationary support of the whole fruit receiving jaws as hereinafter set forth, so as to accommodate the fruits or peaches of different sizes, resulting from the usual grading for size which is about one quarter inch in diameter between successive grades. In addition this spring 172 is cooperative with the slide and operates the movement of the slide 171 as hereinafter made evident from an inspection of the drawings to cause a shifting of the whole fruit relatively to and on the orienting member 174.

The outer end of the slide 171 carries means for orienting a whole fruit with reference to the longitudinal axis of the stem indent of the whole fruit and for supporting the fruit thus properly oriented as to its suture plane. Specifically the outer end of the slide carries a whole fruit receiver or cradle 175 shown in detail in Figure 10. This receiver includes a substantially centrally located stem cavity position or suture plane orienting means 174, which is elongated as shown, and is designed substantially to fit within the longitudinal axis of the stem indent or cavity of the whole peach. The central longitudinal axis of this orienting means 174 lies radially of the whole fruit receiving turret 177 and a vertical plane passing through this axis lies intermediate the two pairs of jaws 181 and 197 of the whole fruit jaws as seen in Figure 9. A vertical plane passing through the central longitudinal axis of the orienting means lies in the suture plane of the peach when the longitudinal axis of the stem cavity of the peach exactly registers with and fits over the longitudinal axis of the orienting means 174.

In addition, on opposite sides thereof, the cradle is provided with concaved or rounded walls which are substantially cup-shaped. These walls at the rear are cut away as shown at 176, so as not to interfere with the opening and closing movements of the lower whole fruit holding fingers or jaws, as shown in Figure 8. It will be noted that the lever arm 168 is arranged so that, when in position to place the whole fruit between the holding jaws hereinafter referred to, the stem axis of the whole peach is angularly disposed with respect to a horizontal line passing through the center of the whole fruit receiving means. Specifically the stem axis is downwardly inclined about 30 degrees to such line. This is particularly important because, as the whole fruit is carried by the gripping means of the whole fruit turret, it must be maintained in this exact position.

The central longitudinal axis of the orienting means 174, as shown in Figure 2, is not only in alignment with the radius of the whole fruit receiving turret 177 but also with the radius of the turret 382 whereby once the suture plane of the whole peach is properly registered and lined up with the vertically disposed central longitudinal plane through the long axis of the orienting means 174 the whole peach thus oriented will be fed to the whole fruit gripping jaws which will grip the peach on opposite sides of the suture plane and hold it thus oriented. Thereafter upon partial rotation of the whole fruit turret 177 the peach maintained in this oriented position will be carried to the sawing station wherein the saw 376 has its plane of rotation disposed radially of this same turret 177 so that as the saw acts upon the oriented peach the saw will cut through the suture plane of the flesh and pit of the peach. Thereafter as will hereinafter be set forth, the sawed halves of the peach thus held together with their suture planes properly oriented will be carried to the main turret 382, and be deposited in the half cups in such a manner that the suture plane will lie substantially flush with the top of the cup and the long central axis of the pit will lie radially of the turret 382 and also extending radially of the division lines of the two cup sections, and will also extend radially of the turret 382 which carries the two pitter blades P as shown in Figure 2, so that in the pitting of each half pit section the two pivotally swinging pitter blades will move about axes parallel with the long axis of the pit and will cut around the long curved marginal edges of the pit, meeting on the underside of the pit whereby cleanly to sever the pit from the flesh of the half peach.

It will thus be seen that the receiver 175 and particularly the orienting or positioning member 174 provides orienting means for effecting the orienting of the whole fruit, and specifically a whole peach, both in respect to its stem indent and suture plane prior to and as the fruit is conveyed and introduced into the transferring or conveying mechanisms of the machine, now to be further described. It will be noted that the slope of the receiver walls, the character of the orienting member 174 which is shaped to lie within and extend longitudinally of the peach stem indent along the suture plane, and the movement of the receiver causes the fruit to be shifted relatively to the orienting member 174 and hence to be oriented both in respect to its stem indent and suture plane, whereby subsequent cutting and processing operations will be properly effected in respect thereto, as will presently appear.

In addition to the foregoing orienting means for positioning the suture plane of the whole fruit in a predetermined plane, means is also provided for shifting the orienting means 174 relatively to the whole peach while the whole peach is supported on said orienting means 174.

In the manual feeding of peaches to the present machine, an operator is required quickly to place a succession of whole peaches one after another on the cradle or whole fruit receiver 175. In the normally intended operation, the operator attempts to place each peach so that the long axis of the stem indent will overlie and fit exactly on and over the long axis of the orienting means 174. In numerous cases due either to fast feeding conditions or inaccuracies or indifferences the peach may be placed on the orienting means 174 so that its long axis does not exactly coincide with the long axis of the stem indent of the peach. In instances the long axis of the stem indent of the whole peach and the long axis of the orienting means may be angularly disposed or in those cases where such two long axes do register, still due to slight projections, bumps or abnormalities in the side walls of the stem cavity the suture plane of the peach may be slightly tilted out of a vertical plane through the central longitudinal axis of the orienting means 174.

In order to cause correct registration of the long axis of the stem indent of the peach with the long axis centrally of the orienting means 174 and to cause a plane passing diametrically through the peach and through the long axis of the stem indent to register with a plane passing vertically through the central longitudinal axis of the orienting means 174 whereby correctly to orient the suture plane radially vertically of the whole fruit receiving turret 177 and passing between the two pairs of whole peach holding jaws as seen in Figure 9, means is provided for relatively shifting the orienting means 174 and the whole peach supported thereon in a manner to cause the two long axes of the stem indent of the peach and the central long axis of the orienting means to shift angularly relatively into exact registration with the suture plane thereof lying in said vertical radial plane of the turret 177. As shown in Fig. 1, the peach, while resting in the holder 175, leans forward toward the machine and rests on orientator 174 and the inner walls of the holder 175. The peach turns about an axis which passes through the pit lengthwise thereby causing the suture plane to come into proper alignment.

This function is additionally accomplished in the present device by forming the cam 160 with relatively small projections or rough surfaces 169' in the cam race in which the roller 165 works. The cam may be of cast-iron with inherent rough surfaces 169', but preferably the cam 160 is formed of hardened metal having inherent roughness 169' in the cam track or race whereby vibration is imparted by such roughened surface to the roller 165. This vibration is considerably multiplied, approximately on a six-fold basis by means of the lever 163, the arm 166, lever 168 to the receiver 175. Thus an additional movement or vibration is imparted to the orienting means 174 upon which the whole fruit is placed. By thus supporting the whole fruit on the orienting means 174 while imparting vertical movement or vibration to this orienting means 174, the peach is vibrated sufficiently so that misplacement of the peach upon this orienting projection 174 will cause the peach to shift or turn about a vertical axis, and angularly relatively to the longitudinal means 174 so that the long axis of the stem indent of the peach will come to aligned position with the central longitudinal axis of the longitudinal means 174. Furthermore, in the event that peaches have slight projections, these bumps or creases on the side walls of their stem indents would otherwise prevent the peach from settling down on the orienting means 174. It will be found that such abnormalities on the side walls of the stem indent will cause the suture plane of the peach to be slanted a slight amount to the vertical plane through the central longitudinal axis of the orienting means 174. It has been found that the vibration imparted to the peach in the manner aforesaid will vibrate the peach sufficiently so that the orienting means will pass by these bumps, projections or creases and the peach will settle down to its maximum extent onto the orienting means 174 and thereby cause the suture plane of the peach to swing toward the vertical plane and hence to coincide with the vertical plane through the central longitudinal axis of the orienting means whereby each successive peach is positioned and properly oriented with its suture plane vertical and aligned with the plane passing centrally of and through the long axis of the orienting means. Hence during this vibration as the oriented peach is conveyed by upward movement of the lever 168 from the position shown in Figure 6 to that shown in Figure 8, and the peach placed between the four jaws of the whole fruit turret, the peach will be oriented and positioned so that its suture plane is disposed vertically and aligned centrally of the four jaws and radially of a vertical plane passing between said jaws and radially of the whole fruit turret 177. Once the long axis of the stem indent registers with the orienting means 174, retraction will not cause relative displacement.

Hence the fruit thus properly oriented is positioned between and held by the holding jaws and is carried through the machine at such proper oriented alignment so that subsequently when the hereinafter mentioned cutters 294 operate they will cut in a predetermined manner with reference to the suture plane of the peach and so also when the peach is passed to the saw mechanism the plane of operation of the sawing mechanism will coincide with the suture plane of the oriented peach and the saw will sever through the whole peach substantially on and through the suture plane of the peach.

*Whole fruit conveying mechanism*

Referring now to the turret proper and to the fruit holding jaws, it will be observed that the intermittently rotatable sleeve 161 carries an additional sleeve 177 and affixed thereto are a plurality of post supports 178, such supports being radially spaced around the central vertical axis of the turret. Each one of these supports 178, in turn, is provided with an upright extension upon which the whole fruit holding jaws are mounted. By reference to Figures 6 to 16, inclusive, the construction and operation of these jaws will be apparent. The lower jaw 181 is pivoted as at 180 to the upright 188. This lower jaw is formed with two integral spaced apart jaws or fruit gripping fingers 181, which have concaved portions 182 and 183 adapted to engage the curvilinear contour of the whole peach on opposite sides of a plane passing substantially vertically through the plane of the suture, as shown in Figures 9 and 12.

In addition, this lower jaw 181 is provided at its rear end with an angularly disposed tooth projection 184, and is provided with a connection 185 with a coil spring 186 as hereinafter set forth. The upper jaw is made in two pieces, whereas the lower jaw is preferably made in a single piece. The details of construction of the upper jaw are shown in Figures 13 and 14. This upper jaw comprises a head portion 197 centrally apertured as at 188. The head is provided with a lateral lug 189 hereinafter referred to, and with an operating roller 190 on its upper portion, and a laterally extending tooth arm 191, the teeth of which mesh with the teeth of the arm of the lower clamping jaw of the whole fruit holding mechanism. In addition, the head portion 197 is provided with a laterally extending fruit clamping jaw 192 having a curvilinear fruit contacting face 193 for engaging the contour of the peach on one side of the plane of the suture. In addition, this jaw is provided with an upstanding lug 194, to which the upper ends of the spring 186 connect. The cooperative part of the upper jaw is formed with a round bearing 195, which easily fits within the opening 188 of the head 197 to permit relative angular movement between the parts. This head is provided with a furcation in the form of a rearwardly extending lug 196, which is adapted to receive the lug 189 therebetween that is formed on the cooperative portion of the first portion of the upper gripping jaws. In addition, this part of the jaw is provided with a forwardly extending gripping portion 197, which is arcuately curved as at 198 to grip the contour of the peach on the opposite sides of the suture planes, as shown in Figures 9 and 14. The furcation 196 and the cooperating lug 189 provide a lost motion connection, which permits two portions of this upper jaw to have vertical adjustment, as shown in Figures 8 and 9, whereby in the event a peach is held, which is of smaller diameter on one side of the suture plane than the other, the upper gripping jaw will adjust itself accordingly, whereby to hold the peach precisely as it is inserted between these jaws when they move together under the tension of the closing springs 186. There are a pair of springs for each jaw—one on each side of the vertical plane through the central portion of these jaws—the upper ends being attached to the pins 194 and 194', respectively, and the lower ends of the springs being attached to the pins 185 and 185' of the lower jaws. It will be noted that the holding portions 181, 181' of the lower jaws and the portions 192, 197 of the upper jaws are spaced apart to permit the entry of the saw 376 therebetween in the subsequent cutting operation of the peach through its suture plane, presently to be described, so that the saw may completely sever the entire peach and its pit while held in these jaws. It will be further noted that this space between these fingers 181, 181' and 192 and 197 lies in the suture plane of the peach, which is approximately the plane of the maximum diameter of the peach, or parallel thereto.

Means for operating the jaw mechanism of the whole fruit holding means comprises a cam 200 which is splined to the upper end of the shaft 155. This cam is provided with an internal camway adapted to receive a roller 202 mounted upon a slide 204 disposed immediately beneath the cam and lying transversely across the shaft 155. The slide is suitably slotted as at 206 (see Figures 6 and 12) to permit movement of the slide back and forth transversely across the axis of the shaft 155. The slot is adapted to move in guideways 208 fixed to the extension support of the machine. The bottom portion of the slide is provided with two depending lugs forming extensions thereon. These lugs are 180 degrees apart. The cam race 202 of cam 200 extends 360 degrees of a total annular travel of the cam. When the slide 204 is moved toward the feed-in station, i. e., away from the main or half fruit turret, the depending lug nearest the main turret moves toward the feed-in station, and thereby pushes the roller 199 on the top of the upper finger of the corresponding whole fruit jaws inwardly toward the shaft 155, thereby positively to open these fruit jaws. Simultaneously, the opposite lug 210, which is spaced 180 degrees therefrom, moves in the same direction to permit the spring 186 to close the oppositely located fruit clamping jaws about or into engagement with a peach positioned by the fruit receiving saddle 175, and thereby hold the whole fruit firmly between the fingers of the jaws. Any variations in size of successive peaches are automatically compensated for by the yielding action of the springs 186 between the upper and lower clamping jaws, and any deviations in size on opposite sides of the plane of the suture of the peach are compensated for by the relative movement between the members of the upper fruit jaw.

The upright 178 on turret 177 has rigidly bolted thereto as at 212 a laterally projecting backing member 214, which is shaped as shown in Figure 8 thereby to position and firmly to hold the rear portion of the peach positioned between the clamping jaws by the whole fruit receiver 175.

By reason of the foregoing construction, the whole fruit turret is intermittently rotated to position each pair of fruit holding jaws at the receiving station, during which time the jaws are automatically held in open position while a whole peach is fed onto the peach-receiving cradle 175 in a manner hereinafter set forth, and thereafter the receiver 175 is moved upwardly to position the peach, as shown in Figure 8, during which time the upper and lower jaws of the clamping members are cam released so as to resiliently approach the peach to grasp and hold it firmly and precisely in the before described predetermined position.

At the same time that the turret is moved, the shaft 155 is synchronously driven to operate automatically the cam and slide hereinbefore mentioned to cause these proper opening and closing movements of these jaws in timed relation.

Further referring to the foregoing mechanism, once the whole peach is placed manually with the long or suture plane axis of its stem cavity registering with and oriented by the positioning nib 174 of the fruit cradle, as illustrated in Figure 9, the whole peach will thereafter be raised upwardly to the position shown in Figure 8, with the stem axis downwardly inclined from the horizontal, as therein shown, and with the suture plane in predetermined position. At this time the whole fruit jaws firmly grasp the fruit as hereinbefore set forth, whereupon the fruit-receiving cradle moves downwardly, the turret then automatically shifts to the stem cavity trimming station; and at the same time an empty set of whole fruit holding jaws is brought into registration ready for the next upward movement of the whole fruit receiving cradle.

It will thus be seen that the whole fruit conveying means cooperates with the orienting means in the infeed station to preserve the orientation of the fruit, both in respect to its stem indent and its suture plane, as the fruit is presented to processing means now to be described.

*Fruit processing means*

Various fruit processing operations are conducted upon the fruit, in accordance with the present invention, some of which may be effected while the fruit is held by the whole fruit conveyor, and others of which are effected as and after the fruit is transmitted to the half fruit conveyor. The several processing operations such as cutting the fruit, bisecting the fruit, pitting the fruit which are effected as and/or after the fruit is transmitted to the half fruit conveyor are described in our aforementioned Patent No. 2,398,780. In the present invention, two types of cutting operations are shown and described which are performed upon the fruit, and both of which are associated with, and in a sense depend upon, the proper suture plane orientation of the whole peach. In one of these cutting operations, in its specific embodiment, cutting means operates upon the surface of the peach at the stem indent, and the cutting operation is dependent upon whether or not the suture plane of the peach is properly oriented. The other cutting operation comprises a bisecting operation, and particularly and specifically, but not by way of limitation, the sawing operation diametrically entirely through the whole peach on or substantially parallel to the suture plane thereof. This cutting operation is necessarily inherently dependent upon a proper orientation of the suture plane of the whole peach because the cut must be formed on or substantially on the suture plane for the proper subsequent processing including pitting of the half peaches.

In the present invention I have shown as part of the processing of the peach, both cutting operations to be formed on the peach; in certain aspects of the invention, the cutting of the peach or peeling of the peach at the stem indent might not necessarily be needed. However, the bisecting of the peach as a part of the processing operation is required and necessary for the subsequent pitting operation.

For the purposes of the disclosure of this invention, the stem cavity peeling means is included in addition to the peach bisecting means, and this mechanism will now be described because in association with certain portions thereof, there is provided inspection means to determine whether or not the suture plane of the whole peach has been properly oriented, together with associated means not only for discharging the peach from the conveying mechanism in the event that the suture plane be not properly oriented but also means for positively locking or preventing the operation of the cutting means for operating on the peach in the event that the suture plane of the peach be not properly oriented. In connection with this suture plane mechanism and peach discharging mechanism, it is not necessary to use those cutting means which peel the stem cavity of the whole peach as the mechanism without the cutting means thereon is adapted to operate in association with the inspector mechanism, and, therefore, one need only to remove the stem indent cutting blades to eliminate that particular cutting action on the peach while preserving the remaining construction which cooperates with and forms a part of the suture plane inspecting mechanism.

In accordance with one aspect of the invention there is disclosed herewith as one of the cutting means which is disposed to cut the peach with relation to the suture plane thereof, in this instance the cutting means comprising stem indent peeling operation and an associated sensing or inspecting operation performed upon the fruit in connection therewith and as herein shown the sensing mechanism operates to roll along the curved surface of the periphery of the fruit while the latter is supported and radially to enter the stem indent of the fruit to a maximum extent if the longitudinal axis of the stem indent be aligned with the plane of the rotatable sensing means, but not otherwise. The turret position at which these last mentioned sensing and stem indent cutting and peeling operations are effected is best illustrated in Figures 17 to 22 inclusive wherein it will be seen that the mechanism comprises a rotatable sensing wheel 283 which engages the surface of the whole fruit and moves into the stem indent longitudinally of the suture plane axis, and a pair of rotatable cutter devices 288 and 290 for peeling the stem indent, all of which are coaxially mounted upon a shaft 280 and are operable upon the whole fruit as and after the whole fruit conveyor has moved so as to move the whole fruit one step from the infeed and orienting station heretofore particularly described. After the whole fruit conveyor has moved the whole fruit through a second step of movement the fruit is engaged by a power driven rotatable cutting saw 376, as also indicated in Figure 12, so as to effect the sawing of the fruit body and the sawing of the fruit pit directly through the fruit suture plane.

Referring first to the stem cavity peeling means, it will be seen by reference to Figure 1 that mounted on the top of the frame 12 is a motor 216, which drives a belt 218 to pulley 220 on the shaft 222. This shaft, in addition carries a worm gear 224 driving another gear 226 (see Figure 18) on the vertical shaft 230. This shaft 230 is connected by means of a universal joint 232 to a telescopic shaft arrangement 234, which has pinned to the lower portion of the telescopic shaft arrangement a bevel gear 236. This telescopic shaft arrangement includes a driving key 238 of usual construction, and a spring 240 whereby to cause the bevel gear to be driven from the shaft 230 while permitting relative reciprocation of the movable portions of the telescopic shaft, and while at the same time permitting a swinging movement of the cutter mechanism driven by the bevel gear 236, as hereinafter set forth.

In addition to the telescopic shaft 234, there is provided a swinging frame arrangement adjacent thereto comprising a bracket 242 rigidly mounted upon a support portion 244 of the main frame. This bracket 242 includes an outstanding pin-like bearing 246, upon which a hub portion 248 of a mounting is adapted to oscillate. This hub portion 248 has a depending socket 250 having a depending shaft 252 affixed thereto as at 254. The bottom portion of this shaft 252 has slidably, adjustably affixed thereto a carriage 256 (see Figures 17 and 18). The upper portion of this carriage is provided with a smaller sleeve 332 carrying a pin 260, on which a pair of rollers 262 are mounted. The lower portion of the carriage carries a ring-like member 264 having a depending bracket 266, which, as shown in Figure 18, comprises arms 268 and 270 and a sleeve-like support 272 for the bottom portion of the telescopic shaft 234. The central arm 270 has a lower portion 276 forming at its bottom end a bearing 278 for the bottom portion of the telescopic shaft arrangement 234. Mounted in the arms 268 and 270 of this lower carriage is the shaft 280, to which is affixed a bevel gear 282 for driving the same from the bevel gear 236. Also mounted upon this shaft 280 between the arms 268 and 270 is the peeling cutter arrangement comprising the stem cavity sensing or inspecting wheel 283 and stem cavity peeling and suture plane cutters 288 and 290 previously referred to in reference to Figure 12. This wheel 283 has opposite hubs 284 loosely mounted on shaft 280, the wheel thus being rotatably mounted so that it can roll on its shaft down into and out of the stem cavity, carrying with it the pair of rotating cutter blades 288 and 290. Adjacent each hub 284 is a collar 285 and 286, which are keyed to the shaft 280 and form a support for the said cutter blades 288 and 290, which are of the general configurations shown in the drawings, and are attached to the collars 285 and 286 by means of the screws 292. It will be noted that the cutter members are staggered 180 degrees, so as to counterbalance the high speed rotation of the cutter shaft. Each cutter comprises generally concaved portions 294 on opposite sides of the wheel 283, and because of this opposite arrangement of these concaved portions of the cutters in combination with the wheel 283, which is adapted to roll in the suture plane axis of the central portion of the peach cavity, the cutters as they rotate will completely and precisely cut and sever the peel from the stem cavity.

Means is provided for oscillating the cutter about its swingable bearing pin 246, and, in association therewith, there is provided a cam mechanism to give the cutter a definite swinging movement. By reference to Figure 17 it will be seen that means is provided to place the stem cavity peeling cutters in position so as to partake of a swinging movement resiliently or yieldingly inwardly toward and into the stem cavity of the peach, and also a positive displacement movement away from the stem cavity of the peach and/or substantially up-and-down or vertical, reciprocatory movement longitudinally of the longer or suture plane axis of the stem cavity.

Referring particularly to Figure 2, mounted upon the whole fruit turret shaft 155 at the top thereof is a cam 300 which is pinned to shaft as at 302. This cam is provided with a camway 304 shown also in Figure 6. Slidably mounted transversely of the shaft 155 is a slide 306, which is slotted as at 308 to permit such movement of this slide. Such slide carries on its upper surface a roller 310 which operates in the cam slide 304, whereby upon rotation of the shaft 155, the slide is reciprocated in the manner shown in Figure 2. This slide at one end carries an operating arm 312 provided with a roller 314. This roller is adapted to contact a vertical plate-like member 316, which is mounted upon the pivoted member 250, which swings with the assembly. A depending arm 318 having a cam portion 319 formed on its lower end, is pivotally mounted at 320 on the rigid portion of the support 242, and it is provided with an inwardly extending shorter arm 322 adapted to be disposed between upper and lower screws 324 and 326, and by means of their adjustment are adapted to determine the position of the cam portion of the arm 318, whereby to determine the adjustment of the movement of the cutter as it approaches the peach stem cavity. Cam member 318 is adapted to contact one of the rollers 262 carried by the sleeve 256 on the swingable shaft 252 which in turn carries the cutters, whereby to prevent the cutters contacting the jaws 181, if no fruit be therebetween. The foregoing roller 314, in cooperation with the plate 316, positively forces the wheel 283 and the cutters out of contact with the stem cavity so as not to interfere with the movement of the whole fruit turret and the whole fruit holding means. On the other hand, a coil spring 328 has one end attached as at 330 to a ring 332 pinned to the depending sleeve 256, and has its opposite end fixed to a pin 334 on an actuatable arm 336 in turn fixed to an oscillatable shaft 338 hereinafter referred to, whereby the spring 328 constantly tends to draw the swingable stem cavity cutter and wheel yieldingly toward the peach when the slide 312 and its roller 314 swings to the left, as viewed in Figure 17.

In addition to this movement, means is preferably provided for raising and lowering the wheel 283 and cutting mechanism in synchronized relation to the inward swinging movement of the parts toward the stem cavity. By means of this arrangement, when the rod 252 is oscillated laterally by the roller 314 on the slide 312, and by means of the spring 328, the rod will shift the entire frame or support 266, which carries the wheel and cutter head, while at the same time the sleeve 256 carrying the parts may be shifted vertically with respect to the rod 252, due to the slot and block arrangement therebetween. The means for vertically raising and lowering the sleeve 256 carrying the cutter head and wheel 283 comprises the bar 336 hereinbefore described, which, when actuated, is adapted to raise and lower the sleeve 256 by means of contact with one of the rollers 262 thereon. The shaft 338 that actuates the bar 336, as shown in Figure 2, is provided at its opposite end with a roller 348, which is shifted by a cam 452 mounted on the shaft 136. Likewise, the sleeve 234 of the telescopic shaft arrangement will be raised and lowered vertically with respect to the sleeve 234, and it also will be retained in vertical alignment by the abutment 238 riding in the slot formed on the sleeve 234.

In accordance with the foregoing it will be seen that the spring 328 resiliently or yieldingly pulls the wheel 283 and the peach relatively toward each other, while at the same time the wheel is given a vertical upward movement through the action of the power actuated arm 336, whereby the wheel is caused to roll relatively along the convex surface of the peach and into and through the suture plane axis of the stem indent if and when the peach is in proper predetermined position.

As the peach leaves the stem cavity peeling station, it is transferred by the whole peach conveyor to the bisecting means i. e. the cutting saw 376 which operates to sever the peach through or substantially through its suture plane into substantially equal size half portions. Referring to Figures 1, 23 and 24, it will be seen that the motor driven shaft 222, previously described, at its outer end carries a pulley 352 which drives a belt 354, the lower end of which drives a pulley 356. The latter is carried on a shaft 358 rotatably mounted in a carriage 360, the opposite end of shaft 358 being connected to and arranged to operate the rotary saw blade 376. It will be seen that by reason of the connections described, the saw will be continuously rotated so long as the motor 216 is in operation. Carriage 360 is carried at the lower end of a swinging arm 362 adjustably mounted as indicated at 364 upon an arm 366 depending from and secured to a bearing piece 368 concentrically surrounding the drive shaft 222.

Means is provided for swinging the arm 362 and the saw blade carried thereby in predetermined timed relation with the movements of the whole fruit turret. Referring particularly to Figure 2, it will be seen that the slide 306, previously described, has one portion thereof extended toward the rotatable saw and has secured thereto an adjustable rod 372, Figure 23, which is in turn pivotally connected to the arm 366 by means of a bracket 370. Accordingly as the slide 306 is operated, in predetermined timed relation with the movements of the whole fruit turret, the rotatable cutting saw 376 will be swung toward and away from the whole fruit to effect the aforementioned sawing operation through the fruit body and through the fruit pit, along the plane of the suture. As heretofore described, the holding jaws for the fruit while in the whole fruit turret are so arranged as to accommodate the movements of the cutting saw.

After the severing of each peach the peach halves are transferred from the whole fruit conveyor to the half fruit conveyor more particularly shown in Figure 2, wherein the two halves of a severed peach are deposited in the two cups that lie on each side of the spreader plates as indicated in Figures 2 and 12. In so depositing a fruit half in each cup the halves are deposited therein with the long axis of the pit extending radially of the turret 382 so that the pitting blades will cut into the flesh of each half fruit around the curved sides of the pit and the axis of pivotal movement of each blade will be parallel to the long axis of the pit. The suture plane will lie substantially in the plane of each severed half pit. Hence each half pit will be subjected to further processing operations, specifically the pitting operation described.

The sawing or bisecting mechanism is illustrated and described in Figures 23 and 24 of the drawings. As the peach leaves the stem cavity peeling station it is transferred by the whole peach conveyor to the cutting saw 376 which operates to sever the peach into substantially equal half-sized portions. From Figure 12 it will be seen that the orienting wheel, the saw and the whole peach conveyor are so constructed as to maintain the suture plane of the fruit in the same position relative to the plane of the orienting wheel 283 and the plane of the bisecting saw 376 although the wheel and saw are in specifically different planes relative to each other. The description of the construction and operation of this saw is set forth in issued Patent 2,420,659 of May 20, 1947.

*Indenture and suture plane orienting means and peach cutting means controlled thereby*

In another aspect or consideration of the invention herein, in addition to the peach orienting mechanism hereinbefore described, due to variations in the sizes and shapes of peaches and whole fruits having stem indents, and other factors of variation, in accordance with the present invention additional peach stem indent and suture plane sensing or control or orienting mechanism, specifically in the form of sensing, gauging, and control means, is provided, as will now be described, such last named orienting mechanism forming a part of control means for controlling the operation of peach processing mechanism, specifically a cutting means, upon the peach in predetermined reference to the peach stem indent and suture plane.

This latter sensing control or orienting mechanism, as specifically herein disclosed, comprises a rotatable wheel adapted to have movement relatively to a whole peach and to roll relatively along the peripheral convex surface of the whole peach and then move yieldingly into the long axis of the stem indenture when the long axis or suture plane axis of the stem indenture registers with the plane of rotation of the wheel.

The entering movement of the wheel forms a part of control means for controlling the operative functioning of peach cutting means, and more specifically inhibits the effective operation thereof when proper entry is not made, the orienting or sensing member thus additionally serving as a rejecting or inhibiting mechanism for precluding the effective operation of the cutting means upon the peach when the peach, in reference to its stem indent and suture plane, is not properly positioned. The orienting or control wheel is of sufficiently large diameter with regard to the dimensions of the longitudinal or suture plane axis of the stem indent whereby when relative motion is produced between the rotatable wheel and the whole peach, and the wheel comes in contact with the convex curvature of the whole peach and then subsequently comes into registration with the stem indent of the whole peach, the wheel due to its said radius of curvature will enter radially into the stem indent to a maximum depth when the wheel registers with the longitudinal or suture plane axis of the stem indent, but not otherwise. When the control wheel or orienting member fails to enter the stem indent, or enters the stem indent in a position angularly disposed in respect to the suture plane, the operative functioning of the processing mechanism of the machine, specifically a cutting means as herein disclosed, is varied and appropriately controlled.

Referring specifically to the mechanism herein disclosed, the rotary wheel orienting or control means is associated directly with stem cavity peeling means disposed at a stem cavity peeling station. The present mechanism is designed efficiently to remove the peeling from the stem cavity of the whole peach, in reference to its suture plane and elongated shape. Experience has shown that in the majority of peaches the stem cavities are of elongated shape and not round, it therefore being important that the peeling operation be effected in predetermined reference to the suture plane of the stem cavity.

In the present instance the stem cavity peeler is disposed to operate upon the whole peach while the latter is held in the whole fruit turret, and is the first station of the mechanism operable upon the whole peach while in the holding jaws of this first turret. The mechanism for removing the stem cavity and peeling is shown in the drawings.

The foregoing mechanism comprises the construction and the functional operation of the mechanism shown and described in Figures 17 to 20 inclusive hereinbefore described and acting in conjunction with the turret mechanisms and jaw mechanisms hereinbefore described, including the means for oscillating the cutter about its swingable bearing pin 246 and in association therewith the cam mechanism to give the cutter the definite swinging movement whereby mechanism is provided to place the stem cavity peeling cutters in position so as to partake of a swinging movement resiliently or yieldably inwardly toward and into the stem cavity of the peach to a maximum extent when the suture plane is in alignment therewith, and also a positive displacement movement away from the stem cavity of the peach and/or substantially up and down or vertical, reciprocatory movement longitudinally of the longer or suture plane axis of the stem cavity, all as hereinbefore described.

In accordance with the foregoing it will be seen that the spring 328 resiliently or yieldingly pulls the orientation or control wheel 283 and the peach relatively toward each other, while at the same time the wheel is given a vertical upward movement through the action of the power actuated arm 336, whereby the orienting wheel is caused to roll relatively along the convex surface of the peach and into and through the suture plane axis of the stem indent if and when the peach is in proper predetermined position.

The stem indenture of the peach in the direction of the suture plane axis merges smoothly and relatively flatly at each end with the convex surface of the peach, whereas in a direction transverse thereto the indenture is bordered by high shoulders merging relatively abruptly with the convex surface of the peach and dropping abruptly into the stem indenture. The curvature of the orienting or control wheel 283 is so predetermined that the wheel will roll into the stem indenture substantially to the bottom thereof when in registraion with the suture plane axis of the indenture. However, if the whole peach is incorrectly positioned in the jaws 181 and 197 so that no stem indenture comes into registration with the wheel no cutting action will occur; or alternatively if the peach is held so that other than the suture plane axis of the stem indenture comes into registration with the plane and path of movement of the orienting wheel the wheel will not enter the stem indenture to an appreciable extent and likewise no effective cutting action will occur.

Applicants have thus provided in the wheel 283, an orienting device which senses the position of the peach both with reference to its stem indent and its suture plane, and which orients and positions the peach and processing cutters 294 in respect to each other and in respect to the peach stem indent and suture plane so that a predetermined processing operation in respect thereto occurs. While the orienting wheel 283 has been specifically disclosed herein in connection with the control of the processing cutters 294 for peeling the stem indent, it is to be understood that a rotatable orienting wheel such as the wheel 283 which rolls relatively to the peach along its peripheral surface, and then into the peach stem indent and further becoming aligned with the suture plane axis thereof, may be variously used as an orientation member of sensing and/or control to effect the sensing and/or control of a peach and its processing mechanism relative to each other so as to effect the processing of the peach in a desired predetermined manner in respect to its stem indent and suture plane. A rotatable orienting wheel which rolls relatively circumferentially of the peach while the wheel and peach are yieldably radially urged toward each other, and which is shaped so as to enter the stem indent in one manner when in alignment with the suture plane, and in a distinguishably different manner when not in alignment with the suture plane, thus serves advantageously and effectively particularly as an orienting member for peaches and like fruit, wherein orientation of the suture plane as well as in respect to the stem indent is a factor of importance, as distinguished from the orientation of cherries and fruit of like character.

As the peach leaves the stem cavity peeling station, it is transferred by the whole peach conveyor to the cutting saw 376 which operates to sever the peach into substantially equal size half portions. It will be seen, particularly by reference to Figure 12, that the orienting wheel, the saw and the whole peach conveyor are so constructed as to maintain the suture plane of the fruit in the same position relative to the plane of the orienting wheel 283 and the plane of the bisecting saw 376, although the wheel and saw are in specifically different planes relative to each other. By this means it will be seen that those peaches which are properly positioned as engaged by the orienting wheel will be maintained in proper position by the conveyor between the orienting wheel and the cutting saw so that the latter effects the bisecting of such peaches substantially along the suture plane thereof, and longitudinally of the peeled stem indent.

After the severing of the peaches the peach halves are transferred from the whole fruit conveyor to the half fruit conveyor more particularly shown in Figure 2, and subjected to further processing operations specifically forming no part of the present invention.

*Inspecting mechanism and associated control mechanism for preventing an improperly oriented peach being cut by any type of cutting mechanism*

The claims of the present invention from one aspect of the invention relate to the combination of inspection means having a shape conforming generally only to the long axis of the stem indent and operable upon the curved periphery of the bodily moving peach and adaptable when in registration with the long axis of the stem indent to move thereinto to a maximum extent to sense or determine whether or not the suture plane of the peach is in a predetermined plane, together with associated mechanism operable preferably upon the means supporting the peach, specifically upon the jaws holding the peach to open the same and discharge the peach therefrom and while the peach or fruit is moving, so that this inspection and the discharge of the peach is accomplished without interrupting movement of the peach alternatively the associated mechanism is operative to render the bisecting means inoperative when the fruit is improperly oriented as to suture plane or as to a definite position.

In another aspect of the invention the inspection means is operative to move bodily with the peach conveyed and also to move relatively thereto a predetermined movement actuating the peach discharge or rendering the bisecting means inoperative.

In the prior application of Henry A. Skog and Richard D. Fox, Serial No. 75,602, filed February 10, 1949, there is disclosed a continuously rotating turret in association with mechanism for orienting the peach without interrupting its continuous movement. Associated with this turret is a transfer mechanism adapted to move congruently with the turret and likewise to move at right angles to the path of movement of the turret, the transfer mechanism functioning to abduct a properly oriented peach and convey the same to an additional continuously moving conveying mechanism with which is associated fruit bisecting and fruit pitting mechanism operable on the fruit as it is moved uninterruptedly along by said second mentioned conveying means, and while in the prior mentioned application the transfer mechanism comprises an impaling blade intermittently operable between the two continuously moving conveyor devices, the same being the continuously rotating orientating turret and the second being the continuously moving conveyor having the bisecting and pitting mechanism associated therewith, it is within the contemplation of the broad features of this invention to substitute for the impaling means of the transfer mechanism jaw mechanism which will positively grasp the fruit and abduct it from the orienting mechanism to the continuously moving second conveyor.

Pursuant to such type of transfer mechanism there is associated in the present case also a transfer mechanism intermittently operable and comprising the jaw mechanism shown for instance in Figure 6, which is adapted to receive a properly oriented peach carried by the orienting cradle 175 and which positions the oriented peach between the jaws of the transfer mechanism of Figure 6 whereupon this transfer mechanism, including the jaws, moves to carry the properly oriented fruit to peach cutting mechanism or peach bisecting mechanism and then finally, through other instrumentalities, to peach pitting mechanism. During or between the intermittent stops of the intermittent transfer mechanism the jaws move continuously from one stop to the next, that is from the in-feed station where the oriented peach is placed between the jaws and the jaws will then close upon the peach the jaws will then move continuously until they arrive at a peach cutting station, whether the same be a station for peeling the stem indent or whether the station be a peach severing station.

In association with this movable turret, inspection means is provided for moving with the peach while it is bodily travelling in the jaws from one station to the other, and during this travel the inspecting mechanism is automatically operable to move relatively into contact with the peach and sense or inspect the suture plane of the peach, specifically by means of or reference to the longitudinal axis of the stem indent, to determine whether or not the suture plane is properly in a predetermined position. If the same be in a predetermined position the jaws of the fruit holder continue to hold the peach and carry it to some type of cutting mechanism. Herein we shall specifically refer to the cutting mechanism as a peach bisecting mechanism. If, on the other hand, the suture plane of the peach be improperly placed, the inspector mechanism will immediately determine this, and will automatically operate upon the jaws to discharge the peach therefrom while the transfer mechanism and inspecting mechanism is in motion so that the peach will not be carried to any type of cutting mechanism.

In another aspect of the invention we provide additional means for locking the cutting mechanism positively out of operation so that it cannot contact the peach to cut the peach. This locking out mechanism is automatically operated by the inspector in the event that the suture plane be not properly placed and is carried on during the movement of the transfer mechanism while moving from the whole fruit feed-in station to the cutting station.

Therefore in one of the aspects of the present invention there is provided means for inspecting a fruit or peach as to its suture plane while the peach is in motion, so that the movement of the fruit or peach need not be interrupted and whereby this transfer mechanism is associated or may be associated between the orienting turret of the prior application of Henry A. Skog and Richard D. Fox, Serial No. 75,602, filed February 10, 1949, and the final conveying mechanism with which the peach bisecting and pitting mechanisms are associated. In the present instance this same transfer mechanism is shown as associated with the suture-plane orienting cradle 175 which is movable to an in-feeding position opposite a pair of jaws of the transfer mechanism. The jaws will then grasp the oriented peach and will convey it to a bisecting station for bisecting the peach, and thereafter to pitting mechanism, all operating in timed relation with the transfer mechanism.

The broad aspects of one feature of this invention, it can therefore be seen, reside in the utilization of inspection means movable with a moving peach, specifically movable with a peach while in the transfer mechanism, together with means operable for discharging the peach from the transfer jaws if the suture plane as thus inspected is not in proper oriented position. Thus this present invention is adaptable to the type of continuously moving peach orienting, bisecting and pitting mechanism wherein the inspecting mechanism cooperates with the transfer mechanism in a way so that the movement or transfer of the peach from one continuously operating orienting mechanism to another continuously moving bisecting and pitting mechanism is operated and in a manner so as not to interrupt the continuous successive spaced apart flow of peaches through the entire mechanism and wherein an improperly oriented peach may be inspected as to its suture plane as the peach moves and if not properly oriented will be thrown out or discharged from the machine before the peach reaches any type of cutting mechanism. The object is to prevent the mutilation of such improperly oriented peaches in a continuously operating machine whereby such peaches may be gathered and re-run through the machine so that the next time they may be properly oriented, bisected and pitted, to provide perfect pitted fruit halves.

In other aspects of the invention the inspecting mechanism and the automatic discharge means controlling the jaws and the cutter lockout mechanism are associated with the details of the mechanism shown in the drawings herein.

*Fruit inspecting means and mechanisms operated thereby*

Means is provided for automatically inspecting the peach as to the suture plane, during bodily movement of the peach. To this end as shown in Figure 8 a bracket 398 is mounted on the frame 303. The outer end of the bracket threadedly receives a stud 401 and a hook 402 is rotatably mounted on this vertical stud. The hub 402 extends outwardly in the form of an arm 404 which is rotatable and oscillatable about the stud 401. Arm 404 has a depending arm 406. Journalled or pivoted about a stud 408 on arm 406 is a horizontal arm 410 and depending from this arm is a projection 412 which engages with one of the jaws 197, see Figures 8 and 9. As shown in Figure 7, secured to the frame 303 is a bracket 414 and secured to the underside of this bracket is another bracket 416, see Figure 8, which has attached thereto a switch or camming surface 418, see also Figure 9. A stud 420, see Figure 7, is stationarily screwed into the frame 303 and has attached to its outer end a spring 422 which is secured at its opposite end to the arm 404.

The inspector hereinafter to be described starts at a stationary or initial starting position against a stop 423 which stop is in the same general vertical plane as the plane of the feed-in station of the jaws on the turret. The depending projection 412 hereinbefore described is in the path of one of the jaws 197 and as the jaw moves in a counterclockwise direction from the whole fruit feed-in station, such as indicated at A in Figure 15, to the first cutting station such as B in Figure 15, the jaw 197 will thus push the projection 412 on the horizontal arm 410 against the tension of the spring 422, with it through any angle desired, depending upon the design of the cam 418, see Figure 9. This angle is dependent upon the starting point and the disposition of the camming surface 418 and also the length of the cam. When the extreme inner end surface of the oscillatable lever 410, see Figure 8, strikes the stationary camming surface 418, see Figure 9, the lever 410 is lifted about its pivot 408 in an upwardly direction so that the projection 412 is disengaged from the jaw 197. Then due to the spring action of the spring 422 the assembly 404, 410 rotates counterclockwise to swing backwardly to the starting point determined by the stop 423 and thereafter to be picked up by the next oncoming jaw 197 of the turret when the turret intermittently moves again. This movement rocks the assembly back and forth about the shaft 155 and travels in timed relation with the movement of the peach carried by the turret during the inspecting period.

Journalled about the stud 424, see Figure 8, is a lever 426 which has at its lower end the inspection nose or stem cavity finder 428. The shape of the inner end of this nose 428 is made elongated or generally shaped to conform to or to correspond with the cavity formed by the longitudinal stem axis of the stem indent. The upper end of the horizontal bar 430 has a lateral branch 432 which carries an arcuate extension 434 terminating in a hook 436, see Figures 7 and 16.

Referring to Figure 15, pivotally mounted under the cam yoke 204, see also Figure 8, is another cam yoke 438 which has studded thereto a roller 440 which in turn is acted up by a cam 442 secured to the shaft 155. Just before the depending projection 412 on oscillatable lever 410 of the assembly has been released from the jaw 197 which will thus permit the assembly to rotate backwardly to the next oncoming jaw, the cam 442 acts on the roller 440. This in turn forces the lever 426 outwardly. Thus the lever 426 in being pushed away carries the inspector 428 away from the peach through the connecting link 444 against the urge of the spring 446. This spring 446 normally tends to urge the inspector 428 toward the peach. Link 444 is pivoted to lever 426 at 427.

The cam 442 is so designed that the inspector 428 is held out in the clear of the oncoming peach carried by the jaws 197 and held out in the clear, that is, out of the path of the oncoming peach, until the oncoming jaws 197 start the forward or counterclockwise movement in timed relation with the peach and carrying the peach. The cam 442 releases the roll 440 and the spring 446 causes the inspector 428 to move radially inwardly toward the peach.

Means have been provided to lock the cutter assembly, whether it be a stem cavity peeling type of assembly, or preferably whether it be a peach bisecting assembly, so that the cutters cannot come into contact with the peach unless properly oriented as to suture plane and means is provided to open the gripper jaws 197 to release non-oriented peaches from the machine. To this end rotatably mounted about a stud 450, see Figure 7, on the bracket 414 is an L-shaped latching member 448 having on one end the notched shoulder 452 and the projection 454, and on the other end a camming surface 456. Referring to Figures 25 and 26, a bracket 548 is secured to the underside of the slide 312 and a lever 460 is rotatably mounted about the stud 462. A light spring 461 has one end connected to the slide 312 and the other end connected to the lever 460. This spring is provided to hold the lever 460 in the position shown in Figure 26, out of the path of the roller 190, see Figure 26. A stop 464 is provided so that when the lever 460 is acted upon it cannot swing too far.

When a peach is properly oriented as to suture plane the inspector 428 will enter to maximum radial extent into the stem cavity as shown in Figure 8, see full lines thereof. When this occurs, the arcuate extension will pass by the projection 454 of the lever 448 and the lever 460 will be held in the position shown in Figure 26 whereby the cutter assembly, as shown in Figure 25 and also as shown in Figure 29 in a little different way, will be allowed to approach the fruit to remove, in the first instance, the peeling from the stem cavity, and as shown in Figure 29 to bisect the peach.

However if the inspector 428 is in the position shown in dot and dash lines in Figure 8, or any position between the two positions shown, the arcuate arm 432 will be moved inwardly and will cause the L-shaped arm 448 to swing about the stud 450 causing the shoulder 452 to pass behind the plate 316 to prevent the cutter moving inwardly, and at the same time the camming surface 456 has pushed the lever 460 into the path of the roller 190 as shown in Figure 28, which controls the opening of the jaws 192 and 197 so that the jaws will automatically open to release the fruit as shown in Figure 27 whereby the same will not be cut either by the stem cavity peeler or by the bisecting means shown in Figure 29.

Due to the action of the cam 306 to cam yoke 306 will move inwardly toward the axis of the shaft 155, the lever 460 will strike the roller 190, thereby opening the jaws 191 and 197 to allow the fruit to roll out. This is the action shown in Figures 27 and 28. Since the shoulder 452 of the lever 448, as seen in Figure 16, has engaged the downwardly depending bar 316 carried by the cutter assembly, the cutter assembly has not been allowed to approach the fruit. When the inspection assembly returns to its starting position in a clockwise direction the hook 436 engages the projection 454, thereby disengaging the shoulder 452 from the plate 316 and the lever 460 returns to its normal position.

Figures 29, 30 and 31 show the device wherein a rotatable cutting saw is substituted for the stem cavity peeler 286. Secured to the cam yoke 312 are two lugs 466 and 467 which have rotatably mounted therebetween a boss 468. This boss is supported by a pin 470. Projecting substantially horizontally therefrom is a long lever 471 which has on its underside the notch 472. Threaded into the stem 252 is the pin 474 which is smaller than the notch 472. Projecting upwardly from the boss 468 is a pin 476 which under certain conditions is engaged by the camming surface 478. Threaded into the stem 252 is a rod 480 which forms a support for one end of the tension spring 482. The other end of this spring is secured to the part 324. A horizontally disposed member 484 is secured to the frame 303 and has at its extreme end a hook 486 which acts as a stop for the outswinging saw assembly 252. Projecting upwardly from the lever 460 is the angular camming surface 478. If all the peaches going through the machine are properly oriented as to suture plane the pin 474 will remain in the notch 472 and the saw assembly will swing back and forth as though the slot 472 and the pin 474 were permanently secured together. However if a peach be not oriented properly as to suture plane, the lever 448 will be moved as in the hereinbefore described operation in connection with Figure 7 so that the camming surface 456 will cause the lever 460 with its camming surface 478 to cause the pin 476 to move counterclockwise, thereby lifting the arm 471 to disengage the notch 472 from the pin 474. Since the diameter of the pin 474 is smaller than the width of the notch 472 and since the arm 252 is resting against the stop 486 and held in this position by the spring 482, the effort of the camming surface 456 will only have to be enough to overcome the weight of the lever or linkage 460 and 471. When this occurs the linkage 471 will merely slide over the pin 474 while the saw assembly is held out against the stop 486 by the spring 482. When the cam yoke on its reciprocation returns the notch 472 to registry with the pin 474 the notch will drop down over the pin to remain and to saw through a peach if properly oriented, or be lifted off again if not properly oriented. Under normal circumstances the slide 306 will reciprocate back and forth and cause the arm 471 through the pin and notch 472 and 474 to drive the saw assembly 252 backward and forwardly to positively saw the peach and thereafter retract. In the event that the peach is not properly oriented, the action of the inspector mechanism as hereinbefore described will cause the L-shaped lever 448, see Figure 31, to cam the vertical lever 460 to actuate the pin 476 to the camming surface 478. This causes the notch lever 471 to raise and permit the pin 474 to disengage from the notch 472 which will allow the spring 482 to pull or retract the saw S to the dotted line position as shown in Figure 29, out of the path of the oncoming peach that has not been properly orientated. The saw will remain in this position until the peach has been discharged from the jaws through the action of the cam lever 456 and 460 against the roller 190 of the jaw assembly, as hereinbefore described. After the peach has been allowed to roll out of the jaws the next operation will continue as hereinbefore described and the lever 471 with the notch 472 will again pick up the pin 474 to constitute a positive drive for the saw in synchronism with the back and forth movement of the slide 306.

It will thus be seen that in the present application the inspector moves bodily together with or along a parallel or adjacent path of travel with the peach as the peach is being carried by the moving turret jaws, and in addition it will be apparent that the inspection is made during the forward feeding movement of the peach and also that the operation of the peach discharging jaws and the locking of the cutter in inoperative position so that it cannot cut the peach are all accomplished by the inspection mechanism during such forward travel bodily together with or along a parallel or adjacent path of travel as heretofore described. Hence there is presented in this application an ingenious mechanism associated with conveying means which is adaptable to a continuous processing machine for inspecting as to suture plane a series or succession of constantly moving peaches and the inspection may be accomplished between a constantly moving orienting mechanism and a constantly moving conveyor bisecting and pitting mechanism, the intermittent operation of the transfer mechanism receiving peaches from a constantly moving orienting mechanism and conveying them in synchronized relation in association with the constantly moving conveyor associated with the bisecting and pitting mechanism.

It is apparent that many widely different embodiments of this invention may be made without departing from the spirit and scope thereof, and therefore it is not intended to be limited except as indicated in the appended claims.

Having thus described the invention, what we claim as new and desire to secure by Letters Patent is:

1. In a peach processing machine, peach conveying means including a plurality of spaced whole peach grasping devices for conveying a succession of whole peaches through a predetermined path from a receiving station to a remotely located cutting station, peach cutting means at said cutting station, means for actuating said cutting means when a peach is delivered to the cutting station by said conveying means, means for feeding in succession to said feeding station peaches generally oriented as to suture plane, means actuated in timed relation to said conveying means for actuating each peach grasping device as it reaches said receiving station to grasp and remove a peach from said feeding means, inspection means mounted for movement at the same rate as each of the succession of peaches to contact each of the succession of peaches while being moved by said conveying means for sensing the position of the suture plane of each peach without interference with the movement of the moving peach, and means operatively controlled by said inspection means and operatively associated with said peach grasping device for releasing from any said device in advance of said cutting station a peach not having its suture plane in a predetermined position.

2. In a peach processing machine, a plurality of spaced pairs of relatively movable peach holding jaws, means for feeding peaches in succession into said pairs of jaws, means for moving said jaws from said feeding means to a peach bisecting station, a peach bisecting member located at the bisecting station, an inspecting member shaped generally to conform to the contour of the stem indent of the peach along its long axis, means mounting said inspecting member for movement parallel to said moving jaws and transversely of the path of the moving jaws to contact the periphery of a peach held in a pair of said jaws and to enter the stem indent of the peach to a maximum extent only when in substantial alignment with the suture plane of the peach, and means operatively connected to the peach bisecting member and responsive to the movement of the inspecting member transversely of the path of the jaws for rendering the bisecting means effective or ineffective to bisect the peach in accordance with the extent of movement of said inspecting member transversely of the path of the jaws.

3. In a machine for processing indented and sutured fruit, means for orienting the fruit as to indent and suture, feeding means for moving the fruit from said orienting means to a fruit bisecting station, and orientation inspection means including a carrier mounted for movement generally parallel to the path of movement of the fruit by said feeding means and in advance of said bisecting station, said orientation inspection means including a fruit engaging member mounted on said carrier for movement transversely to the path of movement of the fruit by said feeding means, said fruit engaging member having a fruit engaging surface shaped generally to conform to the contour of the stem indent of the fruit along its suture plane whereby the movement of said member transversely of the path of the moving fruit is controlled by the proper or improper orientation of the fruit at the suture plane, means at said bisecting station for bisecting the fruit along its suture plane, and means responsive to said transverse movement of the fruit engaging member for discharging the fruit from the feeding means before the fruit reaches the bisecting means whereby the bisecting means is ineffective to bisect fruit not properly oriented as to suture plane.

4. In a machine for processing indented and sutured fruit, means for orienting the fruit as to indent and suture, feeding means for moving the fruit from said orienting means to a fruit bisecting station, and orientation inspection means including a carrier mounted for movement generally parallel to the path of movement of the fruit by said feeding means and in advance of said bisecting station, said orientation inspection means including a fruit engaging member mounted on said carrier for movement transversely to the path of movement of the fruit by said feeding means, said fruit engaging member having a fruit engaging surface shaped generally to conform to the contour of the stem indent of the fruit along its suture plane whereby the movement of said member transversely of the path of the moving fruit is controlled by the proper or improper orientation of the fruit at the suture plane, means at said bisecting station for bisecting the fruit along its suture plane, and means responsive to the transverse movement of said fruit engaging member and operatively connected to said feeding means for discharging an improperly oriented fruit from said feeding means in advance of said bisecting station.

5. In a machine for processing indented whole fruit, feeding means for moving the whole fruit oriented as to stem indent along a predetermined path, and orientation inspection means including a carrier bodily movable parallel to the path of movement of the moving fruit at the same rate as the moving fruit, and a member on said carrier movable laterally of said path into engagement with the moving fruit to inspect the fruit as to stem indent orientation while said fruit is being moved by said feeding means and means for indicating non-oriented fruit.

6. In a machine for processing indented and sutured fruit, feeding means for moving whole fruit generally oriented as to suture plane along a predetermined path, means bodily movable with the fruit at the same rate as said feeding means for inspecting the moving fruit as to suture plane orientation, means for cutting a predetermined portion of the fruit with reference to its suture plane, said cutting means being mounted to engage the fruit carried by said feeding means after passing said inspecting means, and means operatively associated with said feeding means and said inspecting means for discharging from said feeding means in advance of said cutting means a fruit not properly oriented when subjected to said inspecting means.

7. In a machine for processing indented whole fruit, means for conveying the whole fruit, means for orienting as to its stem indent fruit carried by said conveying means, a carrier bodily movable with the fruit at the same rate as the conveying means and parallel to the moving fruit, an orientation inspection member mounted on said carrier for movement transversely to the path of the fruit as conveyed by said conveying means and into engagement with the moving fruit to inspect the moving fruit as to the position of its stem indent, cutting means positioned to engage the fruit after inspection by said member, and means operatively associated with said inspection member and said cutting means for rendering the cutting means ineffective to engage a fruit not properly oriented at the time of engagement with said inspection member.

8. In combination, means for feeding a succession of peaches to a feeding station, peach transfer means including a succession of peach conveying means each operable to carry a peach from said feeding station to a peach bisecting station, peach bisecting means disposed at said bisecting station and including a rotating bisecting member, peach suture plane inspecting means having a portion shaped to contact the periphery of each successive peach held by each of the several conveying means of the transfer means, mechanism for moving the peach inspecting means bodily along with each one of said peach conveying means as said conveying means moves along a portion of its path from said feed station to said bisecting station, means for causing said inspecting means to move relatively to each such peach during said bodily movement to sense the position of the suture plane of the peach, and mechanism automatically controlled by said predetermined relative movement of said inspecting means during said bodily movement along with each peach for discharging the fruit before reaching the bisecting means.

9. In combination, means for feeding a succession of peaches to a feed station, peach transfer means including a succession of peach abducting means each operable to carry a peach from said feeding station to a peach bisecting station, peach bisecting means disposed at said bisecting station and including a rotating bisecting member, peach suture plane inspecting means having a portion shaped to contact the periphery of each successive peach held by each of the several abducting means of the transfer means, mechanism for moving the peach inspecting means bodily along with each one of said abducting means during at least a portion of the travel of said abducting means from said feed station to said bisecting station, means for moving said inspecting means relatively to each peach while the inspecting means is moving bodily along with an abducting means to sense the position of the suture plane of the peach, and mechanism controlled by said relative movement of said inspecting means during the bodily movement thereof with an abducting means for controlling the action of each abducting means for discharging a peach therefrom.

10. The combination with means for feeding a peach oriented as to indent along a predetermined path, means bodily movable with and relative to said peach as the peach is moving for inspecting the peach as to orientation, means for discharging the unoriented peach from the feeding means and means operatively associated with said discharging means and said inspecting means and controlled by movement of the inspecting means relative to the peach for controlling the operation of the peach discharging means.

11. In a machine for processing indented whole fruit, fruit feeding means for feeding a whole fruit along a predetermined path, indent inspecting means, means for moving said inspecting means bodily parallel to said path and in contact with the periphery of a moving fruit being fed by said fruit feeding means, and means for moving said inspecting means transversely of said path while said inspecting means is moving bodily under the action of said last mentioned means to sense the position of the stem indent of the fruit moving with said fruit feeding means and means for indicating non-oriented fruit.

12. In a machine for processing indented whole fruit, whole fruit conveying mechanism for feeding whole fruit along a predetermnied path, fruit position inspecting means comprising a carrier and an inspecting member shiftably mounted on said carrier, means for moving said carrier parallel to said path at the same rate as the fruit is moved by said conveying mechanism, means for moving said inspecting member transversely of said path and relative to said fruit varying amounts depending upon the position of the indent of the fruit as the fruit is being moved by said conveying mechanism, and means governed by variations in the amount of travel of the inspecting member transverse to said path for diverting the fruit from said conveying mechanism.

13. In combination, means for processing indented whole fruit, whole fruit feeding clamps for feeding a succession of whole fruit along a predetermined path, indent inspecting means, means adapted to move said inspecting means parallel to said path and transversely of said path into contact with the periphery of the moving fruit in said clamps and into the stem indent of each of the succession of whole fruit in said clamps when in registration with the stem indents of said fruit and means for indicating non-oriented fruit.

14. In a machine for processing indented whole fruit, whole fruit feeding conveyor for feeding a succession of indented whole fruit along a predetermined path, means for cutting a properly oriented whole fruit along a predetermined axis through the indent of the fruit as the fruit is fed along said path by said fruit feeding conveyor, indent inspecting means, means for moving said inspecting means generally parallel to said path at the same rate as said conveyor, means for moving said inspecting means transversely of said path into contact with the surface of a moving whole fruit on said conveyor and into the stem indent of a properly oriented fruit, and means responsive to the extent of movement of said inspecting means transversely of said path for discharging the fruit from the feeding means before the fruit reaches the bisecting means whereby the bisecting means is ineffective to bisect fruit not properly oriented as to suture plane.

15. In combination, means for feeding a succession of spaced whole fruit along a predetermined path, stem indent inspecting means, means for mounting and operating the inspecting means to move bodily forwardly with a moving whole fruit and to inspect said fruit as to its stem indent during such forward movement and means for moving said inspecting means in a reverse direction relatively to said moving fruit and to register with the next succeeding whole fruit and thereafter to move forwardly with said next succeeding whole fruit.

RAYMOND L. EWALD.
HENRY A. SKOG.

References Cited in the file of this patent

UNITED STATES PATENTS

| Number | Name | Date |
|---|---|---|
| 233,062 | Barlow | Oct. 12, 1880 |
| 2,225,979 | Carroll | Dec. 24, 1940 |
| 2,232,210 | Carroll | Feb. 18, 1941 |
| 2,277,903 | Carroll | Mar. 31, 1942 |
| 2,296,490 | Ashlock | Sept. 22, 1942 |
| 2,352,091 | Fedorchak et al. | June 20, 1944 |
| 2,376,526 | Thompson | May 22, 1945 |
| 2,395,557 | Leathers | Feb. 26, 1946 |
| 2,398,780 | Ewald et al. | Apr. 23, 1946 |
| 2,443,863 | Lindley | June 22, 1948 |
| 2,525,050 | Spicer et al. | Oct. 10, 1950 |